(12) United States Patent
Sumiyoshi et al.

(10) Patent No.: US 8,965,697 B2
(45) Date of Patent: Feb. 24, 2015

(54) NAVIGATION DEVICE AND METHOD

(75) Inventors: Yuki Sumiyoshi, Tokyo (JP); Yuki Furumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/131,658

(22) PCT Filed: Jun. 5, 2012

(86) PCT No.: PCT/JP2012/003678
§ 371 (c)(1),
(2), (4) Date: Jan. 8, 2014

(87) PCT Pub. No.: WO2013/069172
PCT Pub. Date: May 16, 2013

(65) Prior Publication Data
US 2014/0136109 A1 May 15, 2014

(30) Foreign Application Priority Data

Nov. 10, 2011 (WO) .................. PCT/JP2011/006293

(51) Int. Cl.
*G01C 21/00* (2006.01)
*G01C 21/36* (2006.01)

(52) U.S. Cl.
CPC ........ *G01C 21/3664* (2013.01); *G01C 21/3608* (2013.01)
USPC ........................................ 701/539

(58) Field of Classification Search
None
See application file for complete search history.

(56) References Cited

U.S. PATENT DOCUMENTS

| 2011/0257879 | A1   | 10/2011 | Ishibashi |
| 2012/0022876 | A1 * | 1/2012  | LeBeau et al. ................ 704/275 |
| 2013/0325481 | A1 * | 12/2013 | van Os et al. ................ 704/275 |
| 2013/0345959 | A1 * | 12/2013 | van Os et al. ................ 701/408 |

FOREIGN PATENT DOCUMENTS

| JP | 11-337363   | A | 12/1999 |
| JP | 2000-181485 | A | 6/2000  |
| JP | 2002-48572  | A | 2/2002  |
| JP | 2002-221430 | A | 8/2002  |
| JP | 2003-131691 | A | 5/2003  |
| JP | 2005-283239 | A | 10/2005 |
| JP | 2005-316022 | A | 11/2005 |
| JP | 2006-24194  | A | 1/2006  |
| JP | 2006-145331 | A | 6/2006  |
| JP | 2007-248365 | A | 9/2007  |
| JP | 2010-277575 | A | 12/2010 |
| JP | 2011-169622 | A | 9/2011  |
| JP | 2011-185601 | A | 9/2011  |
| JP | 2011-220961 | A | 11/2011 |

* cited by examiner

*Primary Examiner* — Thomas Tarcza
*Assistant Examiner* — Adam Alharbi
(74) *Attorney, Agent, or Firm* — Birch Stewart Kolasch & Birch, LLP

(57) ABSTRACT

A navigation device or method is configured to identify location information and a route setting method from a recognition result obtained by constantly recognizing user's utterance contents, and set a route based on the location information and the route setting method.

15 Claims, 32 Drawing Sheets

FIG.2

| Location Name |
| --- |
| Kiyomizu-dera Temple |
| Kinkaku-ji Temple |
| Kyoto Station |
| ⋮ |
| Sanjo-kawaramachi |
| Shijo-kawaramachi |
| ⋮ |

FIG.3

| Route Setting Expression |
| --- |
| Go |
| Want To Go |
| Let's Go |
| Call At |
| Stop By |
| Take Rest |
| Cancel |
| ⋮ |

FIG.4

| Route Setting Expression | Route Setting Action |
|---|---|
| Go | Set As Destination |
| Want To Go | Set As Destination |
| Let's Go | Set As Destination |
| Call At | Set As Via Point |
| Stop By | Set As Via Point |
| Take Rest | Set As Via Point |
| Cancel | Delete Route |
| ⋮ | ⋮ |

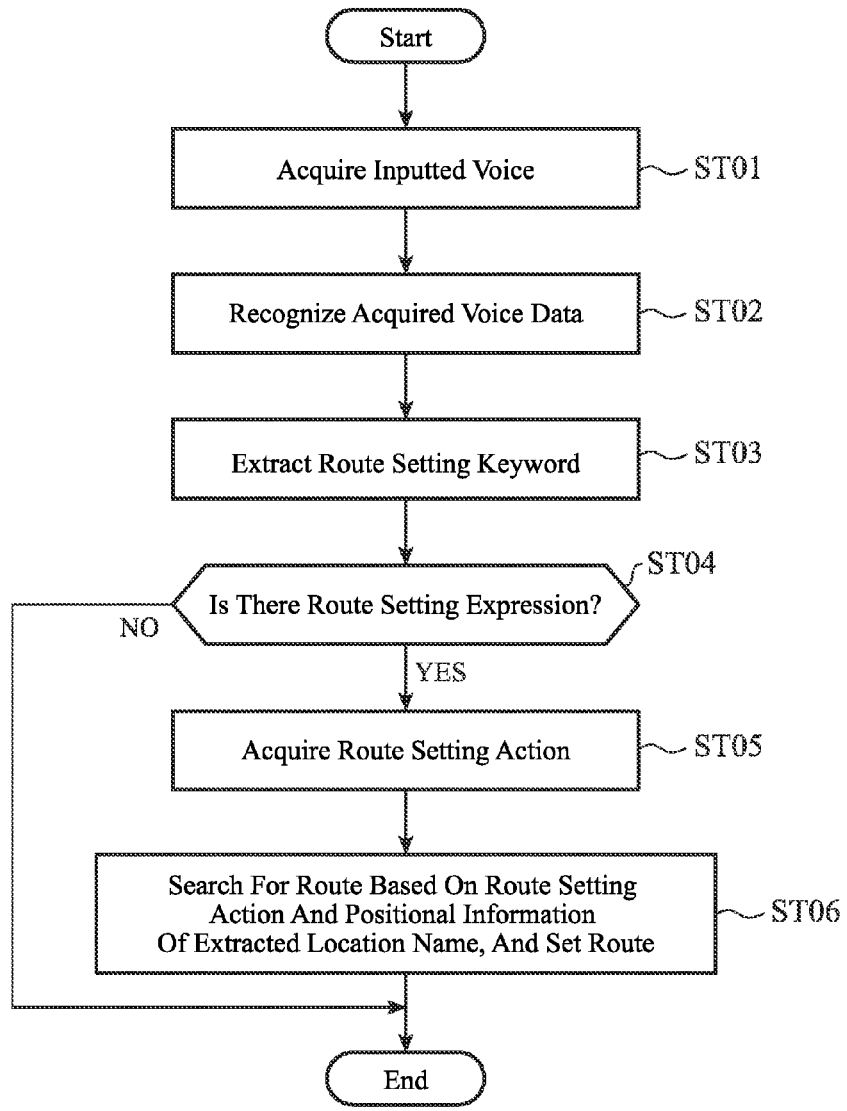

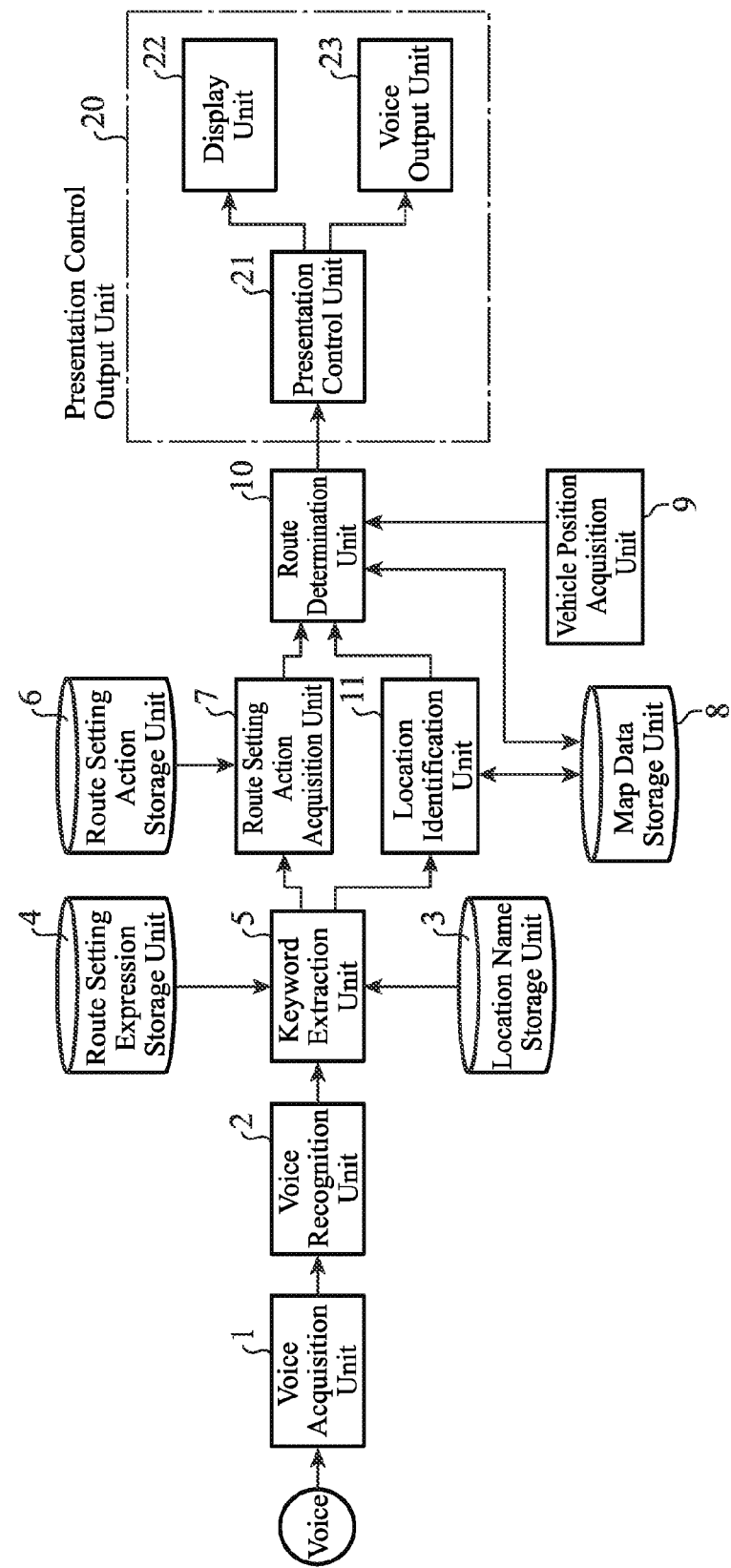

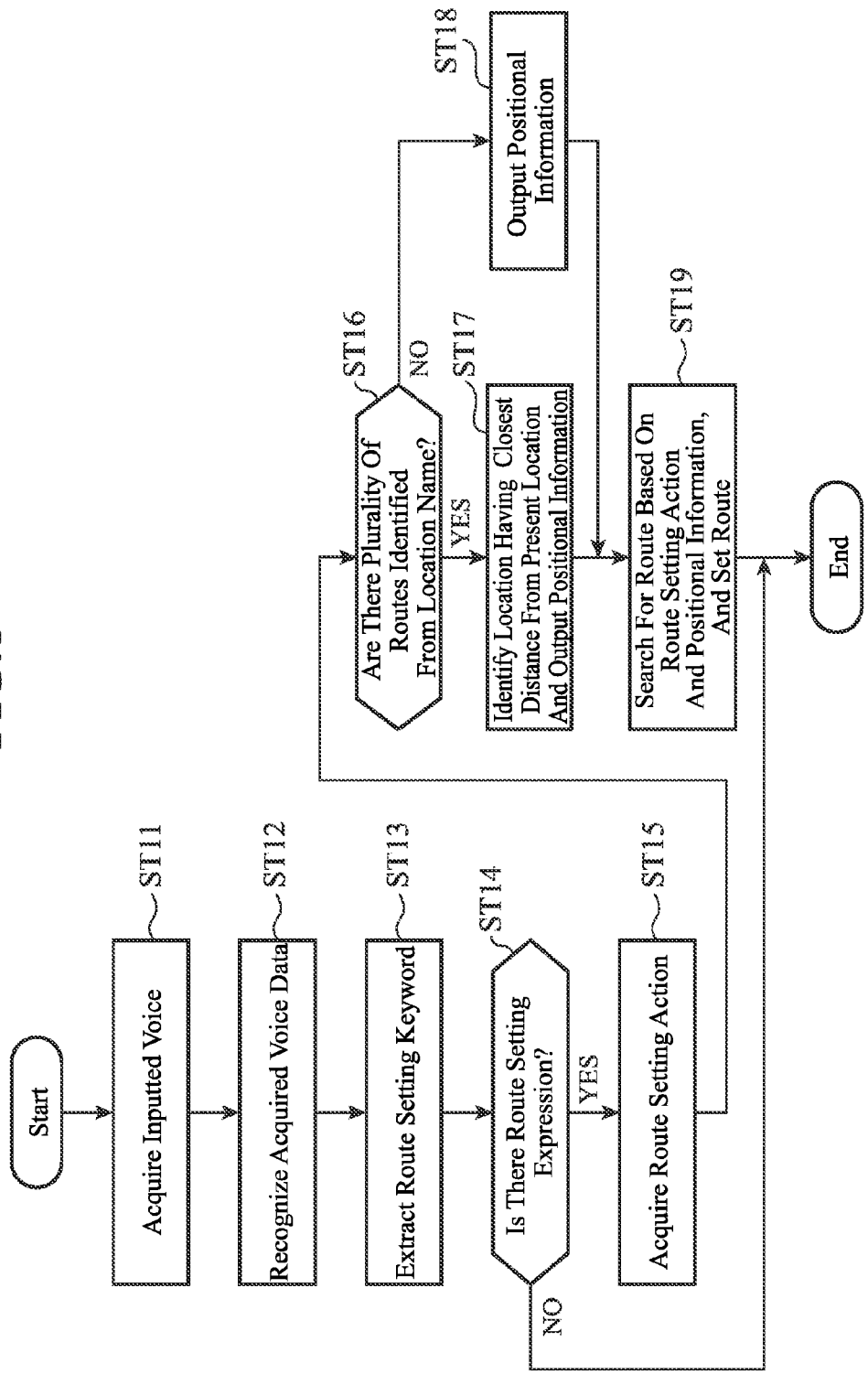

FIG.17

| Want To Go | Today |
|---|---|
| Stop By | Tomorrow |
| Take Rest | Next Time |
| ⋮ | ⋮ |

FIG.21

| Number | Location Name | Route Setting Action |
|---|---|---|
| 1 | Kiyomizu-dera Temple | Set As Via Point |
| | Kyoto Station | Set As Destination |

Search For This Route?

| YES | | NO |

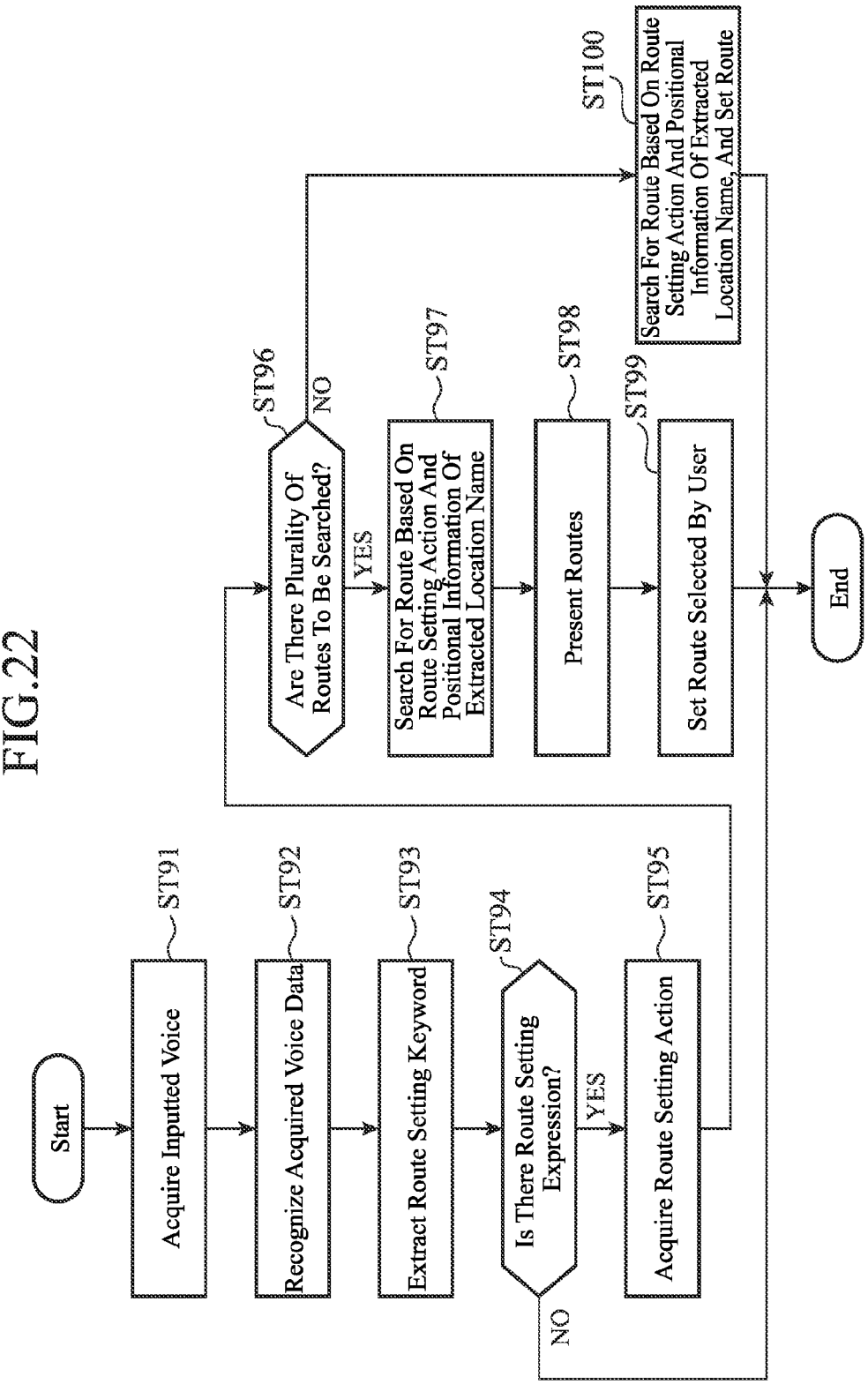

FIG.23

| Number | Location Name | Route Setting Action |
|---|---|---|
| 1 | Kiyomizu-dera Temple | Set As Via Point |
| | Kyoto Station | Set As Destination |
| 2 | Kiyomizu-dera Temple | Set As Via Point |
| | Sanjusangen-do Temple | Set As Via Point |
| | Kyoto Station | Set As Destination |

FIG.24

| Want To Go | Instead Of | Today |
|---|---|---|
| Stop By | Canceling | Tomorrow |
| Take Rest | Cancel | Next Time |
| ⋮ | Let's Cancel | ⋮ |
| ⋮ | Delete | ⋮ |
| ⋮ | ⋮ | ⋮ |

FIG.25

| Number | Location Name | Route Setting Action |
|---|---|---|
| 1 | Kiyomizu-dera Temple | Set As Via Point |
| | Kyoto Station | Set As Destination |
| 2 | Sanjusangen-do Temple | Set As Via Point |
| | Kyoto Station | Set As Destination |

FIG.28

| Importance | Presentation Method 1 | Presentation Method 2 |
|---|---|---|
| 1 | Red | Extra-thick |
| 2 | Yellow | Thick |
| 3 | Blue | Thin |

FIG.30

| Number | Location Name | Route Setting Action | Importance | Presentation Method |
|---|---|---|---|---|
| 1 | Kiyomizu-dera Temple | Set As Via Point | 2 | Yellow |
|  | Kyoto Station | Set As Destination | | |
| 2 | Kiyomizu-dera Temple | Set As Via Point | 1 | Red |
|  | Sanjusangen-do Temple | Set As Via Point | | |
|  | Kyoto Station | Set As Destination | | |

FIG.32

| Route Setting Expression | Route Setting Action | Route Setting Action In No Location Name |
|---|---|---|
| Go | Set As Destination | — |
| Want To Go | Set As Destination | — |
| Let's Go | Set As Destination | — |
| Call At | Set As Via Point | — |
| Stop By | Set As Via Point | — |
| Take Rest | Set As Via Point | Display Rest Area Or Restaurant |
| Cancel | Delete Route | — |
| ... | ... | ... |

FIG.35
(a)
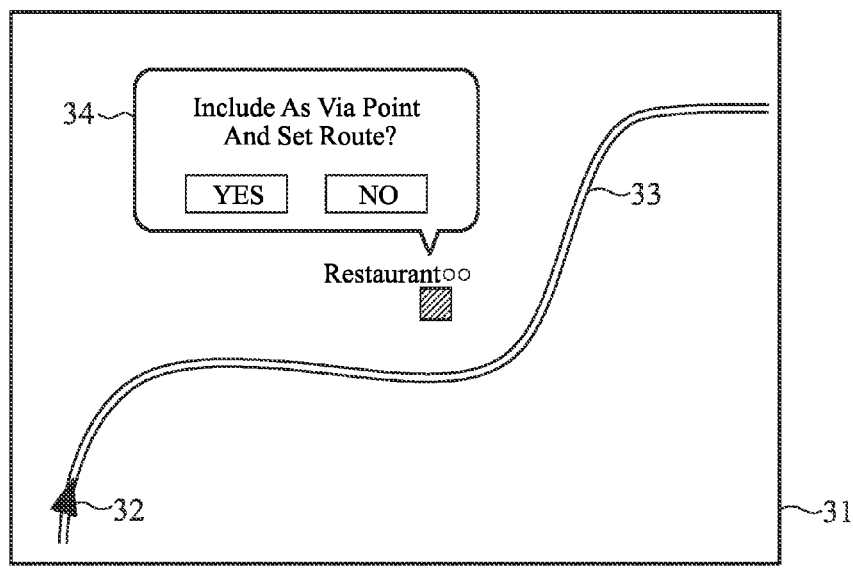
(b)
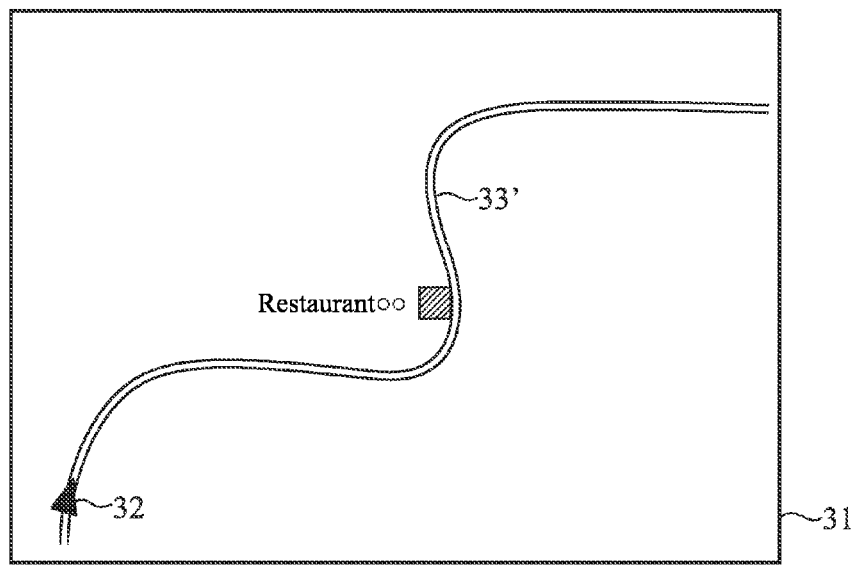

NAVIGATION DEVICE AND METHOD

Cross Reference to Related Applications

This application is the National Phase of PCT/JP2012/003678 filed on Jun. 5, 2012, which claims priority benefit to International Patent Application No. PCT/JP2011/006293 filed on Nov. 10, 2011, all of which are hereby expressly incorporated by reference into the present application.

TECHNICAL FIELD

The present invention relates to a navigation device and method capable of providing navigation while recognizing user's utterance contents.

BACKGROUND ART

Generally, a navigation device such as a vehicle-mounted navigation device provides route guidance for a driver through a voice output, a graphic display, and so on when coming closer to a predetermined location (for example, an intersection in which a traveling direction should be changed) while traveling a set route.

On this occasion, the following navigation device is known: in a situation where user's utterance contents are recorded, when a voice recognition button is pressed, the utterance contents recorded are voice recognized retroactively by a predetermined time to extract location information (location name), and the location information (location name) is set as a destination (for example, refer to Patent Document 1).

PRIOR ART DOCUMENTS

Patent Documents

Patent Document 1: Japanese Patent Application Laid-open No. 2005-316022

SUMMARY IN THE INVENTION

Problems to be Solved by the Invention

However, in the foregoing conventional navigation device, there is the following problem: at the time when a user performs an operation of pressing the voice recognition button, the utterance contents have already been newly updated, so that desired location information cannot be obtained. Also, there is a problem such that it is necessary for the user to perform a manual operation of pressing the voice recognition button and so on, which is troublesome.

The present invention has been made to solve the foregoing problems, and an object of the invention is to provide a navigation device and method capable of identifying the location information and a route setting method from a recognition result obtained by constantly recognizing the user's utterance contents, and setting a route in real time based on the location information and the route setting method.

Means for Solving the Problems

In order to achieve the above object, the present invention provides a navigation device which includes: a position acquisition unit that acquires a position of a mobile object, and which provides route guidance based on the position of the mobile object acquired by the position acquisition unit, and map data, characterized by including: a voice acquisition unit that detects and acquires an inputted voice; a voice recognition unit that constantly recognizes voice data acquired by the voice acquisition unit when the navigation device is activated; a location name storage that stores a place name and a facility name as a location name; a route setting expression storage that stores a route setting expression used when a user performs a route setting; a keyword extraction unit that extracts a location name and a route setting expression from a recognition result related to the voice recognition unit by referring to the location name storage and the route setting expression storage; a route setting action storage that stores a route setting action corresponding to the route setting expression in association with the route setting expression; a route setting action acquisition unit that and acquires the corresponding route setting action based on the route setting expression extracted by the keyword extraction unit by referring to the route setting action storage; and a route determination unit that searches for a route to a location identified from the location name extracted by the keyword extraction unit based on the route setting action acquired by the route setting action acquisition unit, and sets the searched route.

Effect of the Invention

According to the navigation device of the present invention, since it is configured that location information and a route setting method are identified from a recognition result obtained by constantly recognizing user's utterance contents, and the route is set based on the location information and the route setting method, a route setting as expected can be performed in real time without requiring a user's manual operation.

BRIEF DESCRIPTION OF THE DRAWINGS

FIG. 2 is a diagram showing an example of a location name storage unit 3.

FIG. 3 is a diagram showing an example of a route setting expression storage unit 4.

FIG. 4 is a diagram showing an example of a route setting action storage unit 6.

FIG. 5 is a flow chart showing an operation of the navigation device according to Embodiment 1.

FIG. 6 is a diagram showing a route set by a route determination unit 10.

FIG. 7 is a block diagram showing an example of a navigation device according to Embodiment 2.

FIG. 8 is a flow chart showing an operation of the navigation device according to Embodiment 2.

FIG. 17 is a diagram showing an example of the route setting expression storage unit 4 in Embodiment 8.

FIG. 21 is a diagram showing an example of a screen displaying a dialog for confirming a necessity of a route search in Embodiment 9.

FIG. 22 is a flow chart showing an operation of a navigation device according to Embodiment 10.

FIG. 23 is a diagram showing an example of a presentation screen displaying a plurality of pieces of route information in Embodiment 10.

FIG. 24 is a diagram showing an example of a route setting expression storage unit 4 in Embodiment 10.

FIG. 25 is a diagram showing another example of the presentation screen displaying a plurality of pieces of route information in Embodiment 10.

FIG. 28 is a diagram showing an example of a presentation method storage unit 16.

FIG. 30 is a diagram showing an example of a presentation screen displaying a plurality of pieces of route information with importance and presentation methods in Embodiment 12.

FIG. 32 is a diagram showing an example of a route setting action storage unit 6 in Embodiment 13.

FIG. 35 is a diagram showing an example of a screen transition in a case where a dialog for confirming to a user whether or not a route having a searched facility as a via point is set is displayed in Embodiment 13.

BEST MODE FOR CARRYING OUT THE INVENTION

In the following, embodiments of the present invention will be described in detail with reference to the accompanying drawings.

According to the present invention, there is provided a navigation device including a position acquisition unit that acquires a position of a vehicle (mobile object) to provide route guidance based on the position of the vehicle (mobile object) acquired by the position acquisition unit, and map data; when the navigation device is activated, user's voice contents are constantly recognized, and location information and a route setting method are identified from a recognition result thereof, and a route is automatically set based on the location information and the route setting method. It is noted that in the following embodiments, there is described by way of example a case where the navigation device of the invention is applied to a car navigation system mounted on the mobile object such as the vehicle.

Embodiment 1

Figure 1:
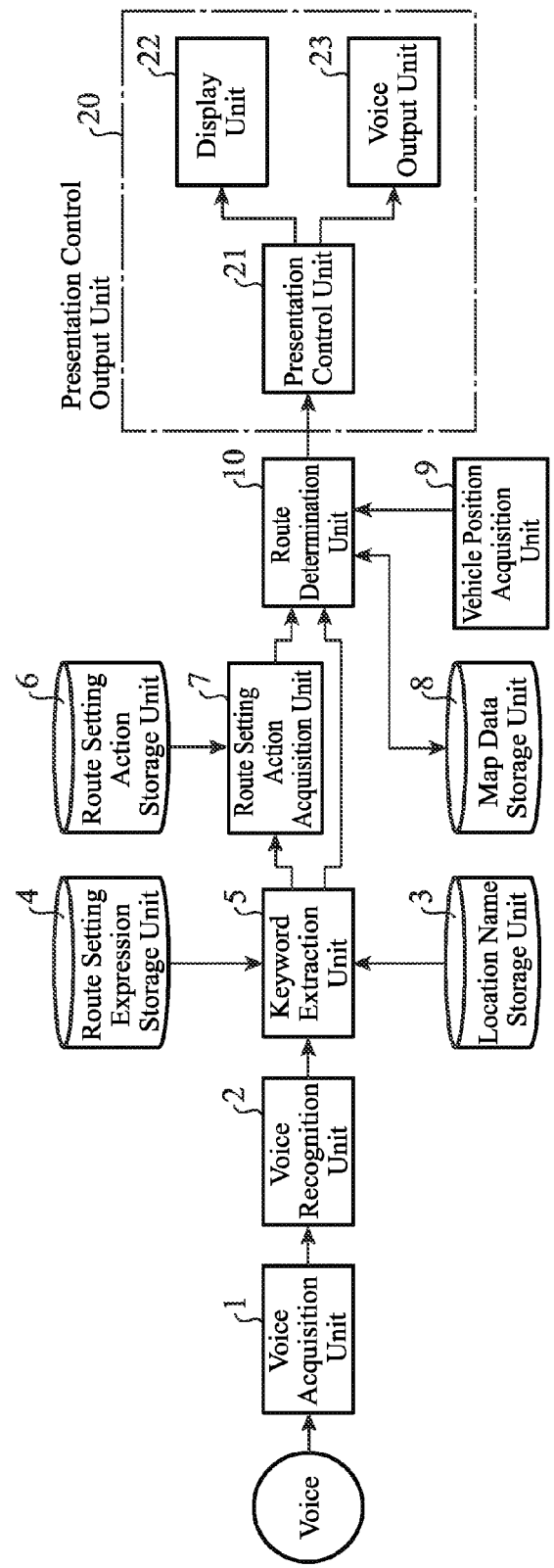
FIG. 1 is a block diagram showing an example of a navigation device according to Embodiment 1.

FIG. 1 is a block diagram showing an example of a navigation device according to Embodiment 1 of the present invention. The navigation device is configured with a voice acquisition unit 1, a voice recognition unit 2, a location name storage unit 3, a route setting expression storage unit 4, a keyword extraction unit 5, a route setting action storage unit 6, a route setting action acquisition unit 7, a map data storage unit 8, a vehicle position acquisition unit (position acquisition unit) 9, a route determination unit 10, a presentation control unit 21, a display unit 22, and a voice output unit 23. Note that the presentation control unit 21, the display unit 22, and the voice output unit 23 constitute a presentation control output unit 20. Note that as not illustrated, the navigation device also includes a key input unit 12 that acquires an input signal through a key, a touch panel, and/or the like, and a time acquisition unit 14 that acquires a time.

The voice acquisition unit 1 subjects a user's utterance collected by a microphone and so on, namely an inputted voice, to A/D conversion, and acquires the resultant in a PCM (Pulse Code Modulation) format, for example.

The voice recognition unit 2 includes a recognition dictionary (not shown), detects a voice section corresponding to contents uttered by a user such as an occupant from voice data acquired by the voice acquisition unit 1, extracts a feature quantity, and performs voice recognition processing using the recognition dictionary based on the feature quantity. In this case, the recognition processing may be performed using a common method such as a Hidden Markov Model. In addition, a voice recognition server on a network may be used as the voice recognition unit 2.

In the meantime, in a voice recognition function installed in a car navigation system and so on, a user commonly specifies (indicates) a start of an utterance and so on to the system. On this account, a button and so on for instructing a voice recognition start (hereinafter, referred to as "voice recognition start instruction unit") is displayed on a touch panel or installed at a steering wheel. Then, after the voice recognition start instruction unit is pressed by the user, the voice by the utterance and so on is recognized. In other words, when the voice recognition start instruction unit outputs a voice recognition start signal, and then the voice recognition unit receives the corresponding signal, the voice section corresponding to the contents of the user's utterance and so on is detected from voice data acquired by the voice acquisition unit after receiving the corresponding signal, and the aforementioned recognition processing is performed.

However, the voice recognition unit 2 in Embodiment 1 constantly recognizes the contents of the user's utterance and so on even without the aforementioned voice recognition start instruction by the user. In other words, even without receiving the voice recognition start signal, the voice recognition unit 2 repetitively performs the following processing: detecting the voice section corresponding to the contents of the user's utterance and so on from the voice data acquired by the voice acquisition unit 1; extracting the feature quantity of the voice data of the voice section; performing the recognition processing based on the feature quantity using the recognition dictionary; and outputting a character string of a voice recognition result. Note that this is similar in the following embodiments.

The location name storage unit 3 stores predicted place names, names of facilities and the like as location names. FIG.

2 is a diagram showing an example of the location name storage unit 3. As shown in FIG. 2, for example, the location name storage unit 3 stores the names of the facilities such as "Kiyomizu-dera Temple", "Kinkaku-ji Temple", and "Kyoto Station", the place names such as "Sanjo-Kawaramachi" and "Shijo-Kawaramachi", and the like as the location names.

The route setting expression storage unit 4 normally stores an expression related to a route setting action among words uttered by the user as a route setting expression. FIG. 3 is a diagram showing an example of the route setting expression storage unit 4. As shown in FIG. 3, for example, the route setting expression storage unit 4 stores action expressions such as "go", "want to go", "let's go", "call at", "stop by", "take a rest", and "cancel" as the route setting expressions related to the route setting actions.

The keyword extraction unit 5 performs morpheme analysis while referring to the location name storage unit 3 and the route setting expression storage unit 4, and extracts the location name and the route setting expression from the character string of the voice recognition result of the voice recognition unit 2.

The route setting action storage unit 6 stores the route setting expression extracted by the keyword extraction unit 5 in association with the route setting action corresponding to the said route setting expression. FIG. 4 is a diagram showing an example of the route setting action storage unit 6. As shown in FIG. 4, for example, with respect to the route setting expressions such as "go", "want to go", and "let's go", the route setting action of "set as a destination" is stored in association with the route setting expressions on the assumption that a final destination is uttered. In addition, with respect to the route setting expressions such as "stop by" and "take a rest", the route setting action of "set as a via point" is stored in association with the route setting expressions on the assumption that a via point along the way is uttered. Further, with respect to the route setting expression such as "cancel", the route setting action of "delete route" is stored in association with the route setting expression on the assumption that a cancel of the route is uttered.

The route setting action acquisition unit 7 searches the route setting action storage unit 6 using the route setting expression extracted by the keyword extraction unit 5 as a search key, and acquires the route setting action corresponding to the route setting expression that matches the search key.

The map data storage unit 8 stores the map data such as road data, intersection data, and facility data. The map data storage unit 8 may be, for example, storage media such as a DVD-ROM, a hard disk, and an SD card, or may be a component (map data acquisition unit) that exists on a network, and is capable of acquiring information such as road data via a communication network.

The vehicle position acquisition unit (position acquisition unit) 9 acquires a present position (longitude and latitude) of the vehicle (mobile object) using information acquired from a GPS receiver, a gyroscope, and/or the like.

The route determination unit 10 refers to the map data stored in the map data storage unit 8 to thus acquire the positional information (longitude and latitude) of the location identified from the location name extracted by the keyword extraction unit 5, searches for a route to the location identified by the location name based on the acquired positional information, the position (longitude and latitude) of the vehicle (mobile object) acquired by the vehicle position acquisition unit (position acquisition unit) 9, and the route setting action acquired by the route setting action acquisition unit 7, and sets the searched route.

Next, a description will be given of an operation of the navigation device according to Embodiment 1 configured as mentioned above. FIG. 5 is a flow chart showing the operation of the navigation device according to Embodiment 1.

First, when there are some utterance inputs, the voice acquisition unit 1 acquires an inputted voice and subjects the voice to A/D conversion, and acquires the voice as voice data in a PCM format, for example (step ST01). Next, the voice recognition unit 2 recognizes the voice data acquired by the voice acquisition unit 1 (step ST02). Then, the keyword extraction unit 5 extracts the location name, and the route setting expression corresponding to the location name from the recognition result of the voice recognition unit 2 while referring to the location name storage unit 3 and the route setting expression storage unit 4 (step ST03). At this stage, when the route setting expression is extracted (case of YES in step ST04), the route setting action acquisition unit 7 searches the route setting action storage unit 6 using the route setting expression extracted by the keyword extraction unit 5 as the search key, and searches the route setting expression matching the search key to thus acquire the route setting action corresponding to the route setting expression (step ST05).

Thereafter, with respect to the location name extracted by the keyword extraction unit 5, the route determination unit 10 acquires the position thereof by referring to the map data storage unit 8, searches for the route based on the acquired positional information, the route setting action acquired in step ST05, and the present position of the vehicle (mobile object) acquired by the vehicle position acquisition unit (position acquisition unit) 9, and sets the searched route (step ST06). On the other hand, when the route setting expression is not extracted (case of NO in step ST04), the processing is ended.

In an illustration by a specific example, for example, when the user utters "let's go to Kyoto Station after stopping by at Kiyomizu-dera Temple", the voice acquisition unit 1 acquires voice data of the utterance (step ST01) and the recognition result of "let's go to Kyoto Station after stopping by at Kiyomizu-dera Temple" is obtained by the voice recognition unit 2 (step ST02). Then, the keyword extraction unit 5 refers to the location name storage unit 3 as shown in FIG. 2 and the route setting expression storage unit 4 as shown in FIG. 3 to thus extract "Kiyomizu-dera Temple" as the location name and "stop by" as the route setting expression corresponding to "Kiyomizu-dera Temple" and extract "Kyoto Station" as the location name and "let's go" as the route setting expression corresponding to "Kyoto Station" (step ST03).

Moreover, although the location names are extracted by referring to the location name storage unit 3 as shown in FIG. 2, it is configured such that the location name is extracted from information related to the facilities and addresses, and the like by taking the map data stored in the map data storage unit 8 into consideration, and using a publicly known morpheme analysis method or a publicly known semantic interpretation method.

Then, since the route setting expressions "stop by" and "let's go" are extracted (case of YES in step ST04), the route setting action acquisition unit 7 searches the route setting action storage unit 6 as shown in FIG. 4 using the route setting expressions "stop by" and "let's go" as the search keys, and searches route setting expressions matching the search keys to thus acquire the route setting action "set as via point" corresponding to "stop by" and the route setting action "set as destination" corresponding to "let's go" (step ST05).

Thereafter, the route determination unit 10 refers to the map data storage unit 8 to acquire positions of the location names "Kiyomizu-dera Temple" and "Kyoto Station", searches for a route having "Kiyomizu-dera Temple" as the via point and "Kyoto Station" as the destination, based on the positional information of the "Kiyomizu-dera Temple" and the route setting action of "set as via point" acquired from the route setting expression "stop by" corresponding to the information, the positional information of "Kyoto Station" and the route setting action of "set as destination" acquired from the route setting expression "let's go" corresponding to the information, and the position of the vehicle (mobile object), and sets the searched route (step ST06).

FIG. 6 is a diagram showing the information set by the route determination unit 10 through the above processing, and showing the route in which the location name "Kiyomizu-dera Temple" is "set as via point" and the location name "Kyoto Station" is "set as destination".

As described above, according to Embodiment 1, since the location information and the route setting method are identified from the recognition result obtained by constantly recognizing the user's utterance contents, and the route setting is automatically performed based on the location information and the route setting method, the route can be set in real time and a situation such that the update of the utterance contents disables setting of a desired route can be prevented. In addition, the route setting as expected can be performed without requiring a manual route setting operation by the user, so that a user's convenience is improved. Further, since the voice acquisition and voice recognition are constantly performed whenever the navigation device is activated even without awareness of the user, the user's manual operation or input intention for the voice acquisition or voice recognition start is not required.

Embodiment 2

FIG. 7 is a block diagram showing an example of a navigation device according to Embodiment 2 of the present invention. Note that components similar to those described in Embodiment 1 are denoted by same reference numerals, and duplicated descriptions thereof will be omitted. In Embodiment 2 described below, compared with Embodiment 1, there is further provided with a location identification unit 11. Then, when there are a plurality of locations identified by a specific location name uttered by a user (case where there are a plurality of locations in which positions are different under the same place name), a location having a close distance from a present location is selected and a route to the selected location is set.

Where there are the plurality of locations identified from the location name extracted by the keyword extraction unit 5, the location identification unit 11 identifies a location having a close distance from a present position of a vehicle (mobile object), and outputs positional information thereof.

In addition, a route determination unit 10 refers to map data stored in a map data storage unit 8 to acquire positional information (longitude and latitude) of the location identified from the location identification unit 11, searches for a route to the location identified from the location name extracted by the keyword extraction unit 5, based on the acquired positional information, the position (longitude and latitude) of the vehicle (mobile object) acquired by a vehicle position acquisition unit (position acquisition unit) 9, and a route setting action acquired by a route setting action acquisition unit 7, and sets the searched route.

Next, a description will be given of an operation of the navigation device according to Embodiment 2 configured as mentioned above. FIG. 8 is a flow chart showing the operation of the navigation device according to Embodiment 2.

Since processing of steps ST11 to ST15 are the same as that of steps ST01 to ST05 in the flow chart shown in FIG. 5 according to Embodiment 1, a description thereof will be omitted. Then, in Embodiment 2, for example, the location identification unit 11 refers to the map data stored in the map data storage unit 8 to decide whether or not there exist the plurality of locations identified from the location name extracted in step ST13 (step ST16). Then, when there are the plurality of locations (case of YES in step ST16), the identification unit further refers to the map data to calculate distances from the present location to the locations, identifies the location having the closest distance, and outputs the positional information thereof (step ST17). On the other hand, when there exist no plurality of locations (case of NO in step ST16), the identification unit acquires the positional information of the location, identified from the location name, from the map data, for instance, and outputs the information (step ST18).

Finally, the route determination unit 10 searches for the route based on the positional information outputted in step ST17 or ST18, the route setting action acquired in step ST15, and the present position of the vehicle (mobile object) acquired by the vehicle position acquisition unit (position acquisition unit) 9, and sets the searched route (step ST19).

In an illustration by a specific example, in a similar manner to Embodiment 1, for example, when the user utters "let's go to Kyoto Station after stopping by at Kiyomizu-dera Temple", the voice acquisition unit 1 acquires voice data thereof (step ST11) and a recognition result of "let's go to Kyoto Station after stopping by at Kiyomizu-dera Temple" is obtained by a voice recognition unit (step ST12). Then, the keyword extraction unit 5 refers to a location name storage unit 3 as shown in FIG. 2 and a route setting expression storage unit 4 as shown in FIG. 3 to extract "Kiyomizu-dera Temple" as the location name and "stop by" as the route setting expression corresponding to "Kiyomizu-dera Temple" and extract "Kyoto Station" as the location name and "let's go" as the route setting expression corresponding to "Kyoto Station" (step ST13).

Then, since the route setting expressions "stop by" and "let's go" are extracted (case of YES in step ST14), the route setting action acquisition unit 7 searches the route setting action storage unit 6 as shown in FIG. 4 using the route setting expressions "stop by" and "let's go" as search keys, and searches route setting expressions matching the search keys to thus acquire the route setting action "set as via point" corresponding to "stop by" and the route setting action "set as destination" corresponding to "let's go" (step ST15).

Thereafter, for each of the location names "Kiyomizu-dera Temple" and "Kyoto Station", the location identification unit 11 decides whether or not there are the plurality of locations identified by the specific location name (step ST16). First, with respect to the location name "Kiyomizu-dera Temple", by referring to the map data, it is understood that temples named "Kiyomizu-dera Temple" exist in Kyoto Prefecture and Hyogo Prefecture. Specifically, since there are two places of the locations identified by the specific location name called this "Kiyomizu-dera Temple" (case of YES in step ST16), the distance from the present location to Kiyomizu-dera Temple in Kyoto Prefecture and the distance from the present location to Kiyomizu-dera Temple in Hyogo Prefecture are calculated in order to identify the location at one place of the two. On this occasion, for example, if the present location is within Kyoto City, since the distance to Kiyomizu-dera Temple in Kyoto Prefecture is shorter, Kiyomizu-dera Temple in Kyoto Prefecture is identified, and positional information thereof is outputted (step ST17). In addition, with respect to the location name "Kyoto Station", by referring to the map data, since the location identified from the name is one place (case of NO in step ST16), the location is identified, and positional information thereof is outputted (step ST18).

Thereafter, the route determination unit 10 searches for the route having "Kiyomizu-dera Temple" in Kyoto Prefecture as the via point and "Kyoto Station" as the destination based on the positional information of "Kiyomizu-dera Temple" outputted in step ST17 and the route setting action of "set as via point", the positional information of "Kyoto Station" outputted in step ST18 and the route setting action of "set as destination", and the position of the vehicle (mobile object), and sets the searched route (step ST19).

Additionally, it may be configured such that whether or not the location identifying function in Embodiment 2 is used can be set by a user.

As described above, according to Embodiment 2, in addition to the advantageous effects in Embodiment 1, since the locations that are highly likely to be the destination or via point are selected and the route is set even when there are the plurality of locations identified from the location name uttered by the user, the route deviating from the user's intention can be prevented from being set.

Embodiment 3

Figure 9:
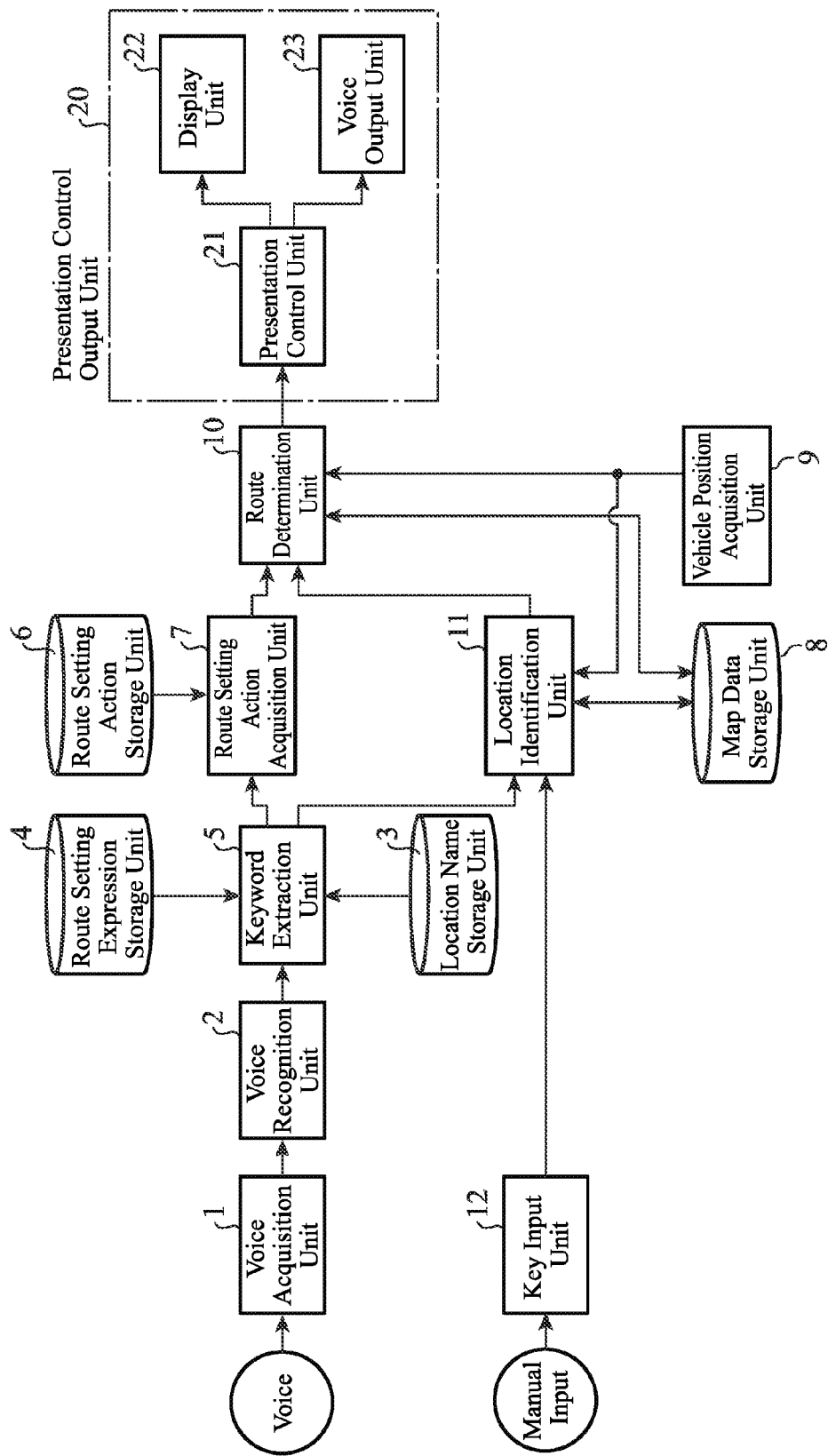
FIG. 9 is a block diagram showing an example of a navigation device according to Embodiment 3.

FIG. 9 is a block diagram showing an example of a navigation device according to Embodiment 3 of the present invention. Note that components similar to those described in Embodiments 1 and 2 are denoted by same reference numerals, and duplicated descriptions thereof will be omitted. In Embodiment 3 described below, compared with Embodiment 2, a key input unit 12 not illustrated in Embodiments 1 and 2 is shown. Then, when there are a plurality of locations identified by a specific location name uttered by a user (case where there are a plurality of locations in which positions are different under the same place name), the plurality of locations are presented to the user and one of the locations is selected by the user, and a route to the selected location is set.

The key input unit 12 is an input unit such as a keyboard, a button, a mouse, or a touch panel that allows an input manual operation by the user. Then, when there are the plurality of locations identified from a location name extracted by a keyword extraction unit 5, the user can select which of a plurality of pieces of location information is adopted by the key input unit 12.

Figure 10:
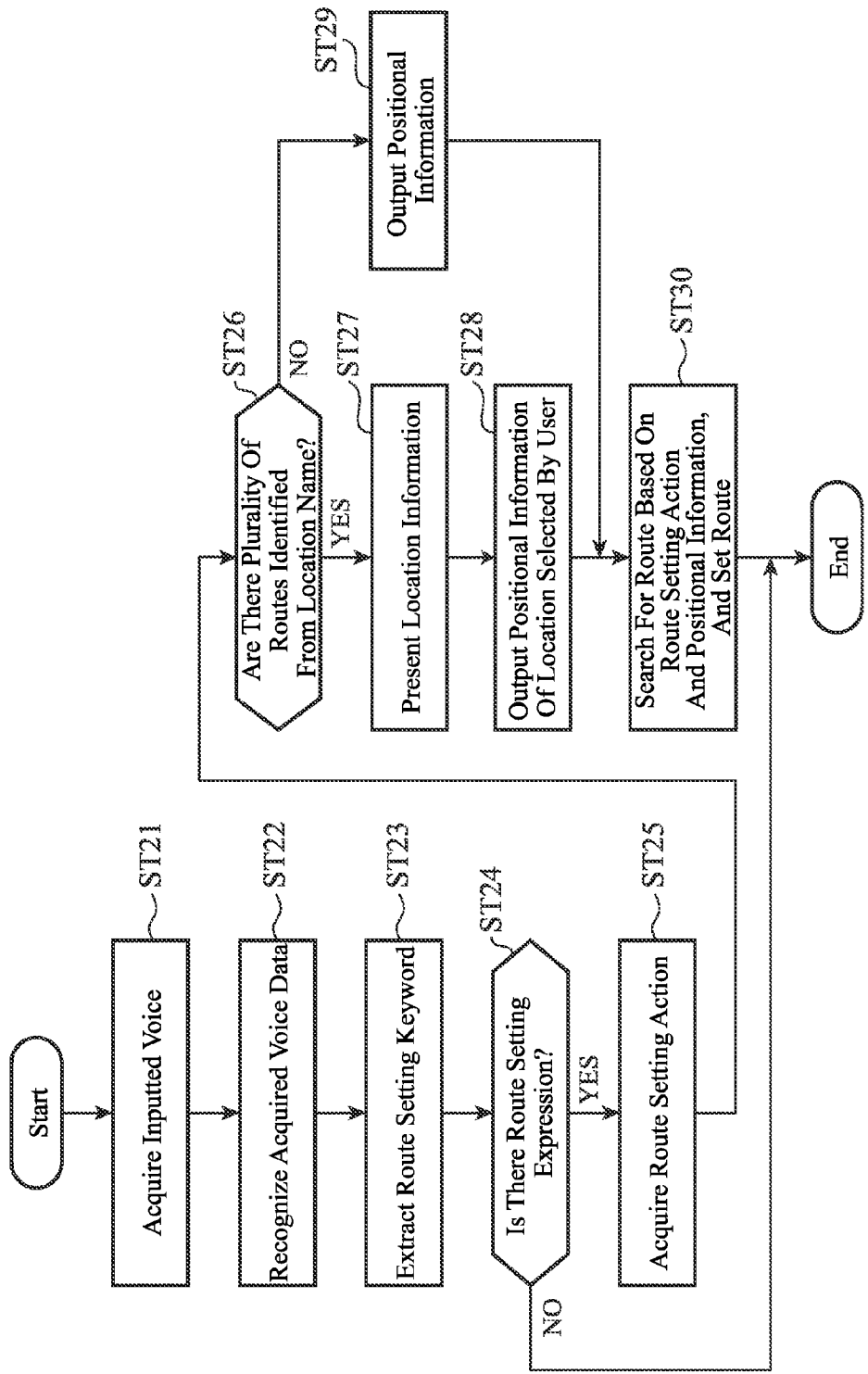
FIG. 10 is a flow chart showing an operation of the navigation device according to Embodiment 3.

Next, a description will be given of an operation of the navigation device according to Embodiment 3 configured as mentioned above. FIG. 10 is a flow chart showing the operation of the navigation device according to Embodiment 3.

Since processing of steps ST21 to ST26 are the same as that of steps ST11 to ST16 in the flow chart shown in FIG. 8 according to Embodiment 2, a description thereof will be omitted. Then, in Embodiment 3, in Step ST26, the location identification unit 11 decides whether or not there exist the plurality of locations identified from the location name extracted in step ST13 by referring to the map data stored in the map data storage unit 8, for example; as a result, when there are the plurality of locations (case of YES in step ST26), these plurality of pieces of location information thereof are presented to the user by displaying the location information as a list, mark displaying the information on a map, or the like (step ST27). When the user selects by the key input unit 12 as to which of the plurality of pieces of location information presented is adopted, the location at one place is identified, and thus the positional information thereof is outputted (step ST28). On the other hand, when there exist no plurality of locations (case of NO in step ST26), the identification unit acquires positional information of the location, identified from the location name, from the map data, for example, and outputs the information (step ST29).

Finally, the route determination unit 10 searches for a route based on the positional information outputted in step ST28 or ST29, the route setting action acquired in step ST25, and a present position of a vehicle (mobile object) acquired by a vehicle position acquisition unit (position acquisition unit) 9, and sets the searched route (step ST30).

In an illustration by a specific example, for example, similarly to Embodiments 1 and 2, when the user utters "let's go to Kyoto Station after stopping by at Kiyomizu-dera Temple", the voice acquisition unit 1 acquires voice data thereof (step ST21) and a recognition result of "let's go to Kyoto Station after stopping by at Kiyomizu-dera Temple" is obtained by a voice recognition unit (step ST22). Then, the keyword extraction unit 5 refers to a location name storage unit 3 as shown in FIG. 2 and a route setting expression storage unit 4 as shown in FIG. 3 to extract "Kiyomizu-dera Temple" as the location name and "stop by" as the route setting expression corresponding to "Kiyomizu-dera Temple" and further extract "Kyoto Station" as the location name and "let's go" as the route setting expression corresponding to "Kyoto Station" (step ST23).

Then, since the route setting expressions "stop by" and "let's go" are extracted (case of YES in step ST24), the route setting action acquisition unit 7 searches a route setting action storage unit 6 as shown in FIG. 4 using the route setting expressions "stop by" and "let's go" as search keys and searches route setting expressions matching the search keys to thus acquire the route setting action "set as via point" corresponding to "stop by" and the route setting action "set as destination" corresponding to "let's go" (step ST25).

Thereafter, for each of the location names "Kiyomizu-dera Temple" and "Kyoto Station", the location identification unit 11 decides whether or not there are the plurality of locations identified by the specific location name (step ST26). First, with respect to the location name "Kiyomizu-dera Temple", by referring to the map data, it is understood that temples named "Kiyomizu-dera Temple" exist in Kyoto Prefecture and Hyogo Prefecture. Specifically, since there are two places of the locations identified by the specific location name called "Kiyomizu-dera Temple" (case of YES in step ST26), in order to identify one of the two locations, location information of the two locations is presented to the user by, for example, displaying "Kiyomizu-dera Temple of Kyoto Prefecture" and "Kiyomizu-dera Temple of Hyogo Prefecture" as a list, or mark displaying a position of Kiyomizu-dera Temple of Kyoto Prefecture and a position of Kiyomizu-dera Temple of Hyogo Prefecture by displaying a map, or the like (step ST27). Then, when the one location is selected by the user, the location identification unit 11 identifies the selected location and outputs the positional information thereof (step ST28). On the other hand, with respect to the location name "Kyoto Station", by referring to map data, it is found that there is one place of the location identified from the name (case of NO in step ST26), and thus the location identification unit 11 identifies the location and outputs the positional information (step ST29).

Thereafter, the route determination unit 10 searches for the route having "Kiyomizu-dera Temple" in Kyoto Prefecture as the via point and "Kyoto Station" as the destination, based on the positional information of "Kiyomizu-dera Temple" outputted in step ST28 and the route setting action of "set as via point", the positional information of "Kyoto Station" outputted in step ST29 and the route setting action of "set as destination", and the position of the vehicle (mobile object), and sets the searched route (step ST30).

Moreover, though in this embodiment, there is described such that when there are the plurality of locations identified from the specific location name, the plurality of locations are displayed on the display or the like, any method of the presentation to the user such as presentation by a voice output may be adopted. Also, for example, when the presentation is made by the voice output, it is conceivable such that the selection by the user is also made by the voice input; with respect to the selection method, needless to say, it is also not limited to the selection through the key input unit 12.

Additionally, it may be configured such that whether or not the location identifying function in Embodiment 3 is used can be set by the user.

As described above, according to Embodiment 3, in addition to the advantageous effects in Embodiment 1, even when there are the plurality of locations identified from the specific location name uttered by the user, the location is identified at one place such that the location to be expected as the destination or the via point is selected by the user, and the route is set; thus, the route deviating from the user's intention can be prevented from being set.

Embodiment 4

Figure 11:
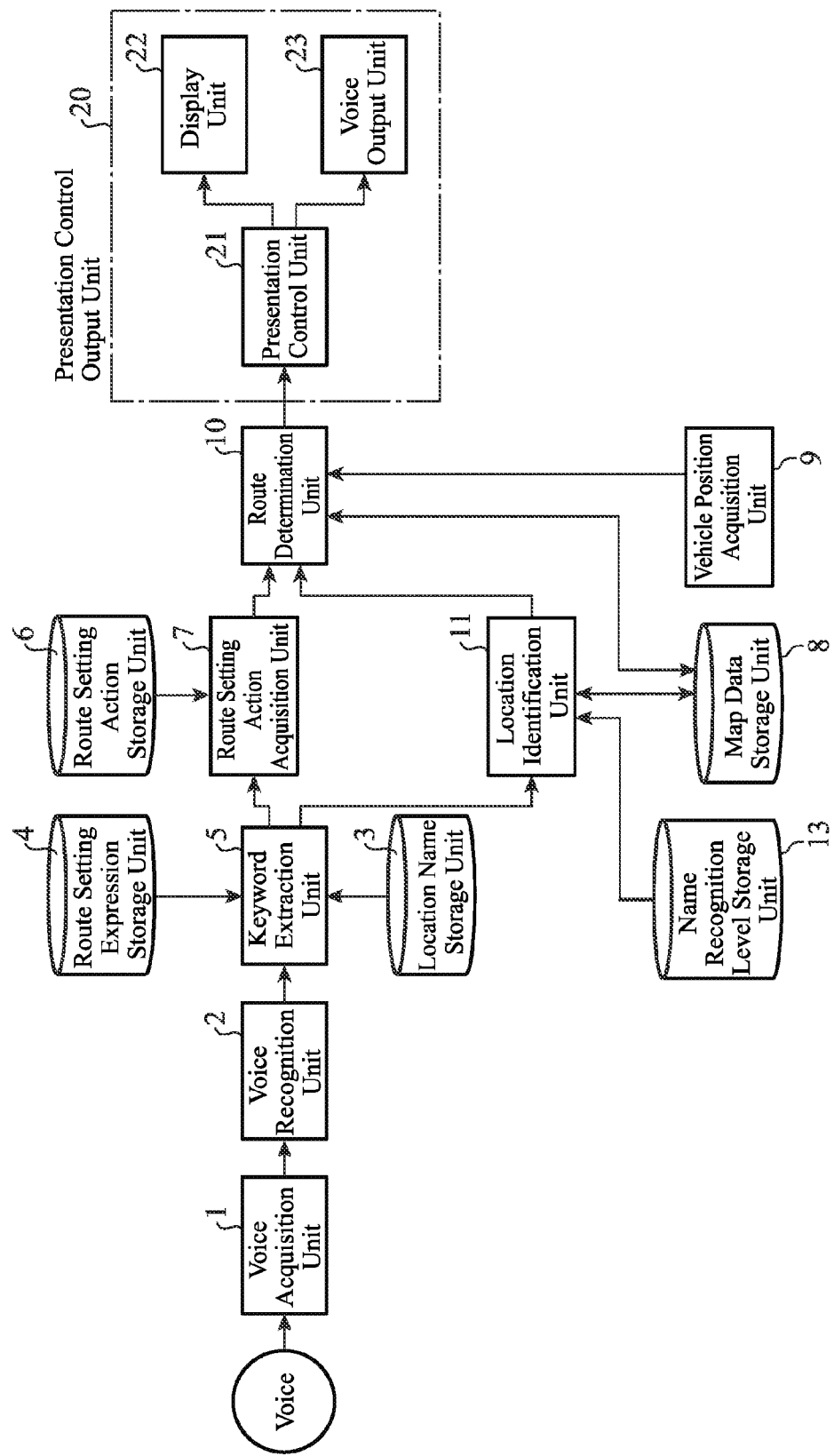
FIG. 11 is a block diagram showing an example of a navigation device according to Embodiment 4.

FIG. 11 is a block diagram showing an example of a navigation device according to Embodiment 4 of the present invention. Note that components similar to those described in Embodiments 1 to 3 are denoted by same reference numerals, and duplicated descriptions thereof will be omitted. In Embodiment 4 described below, compared with Embodiment 2, there is further provided with a name recognition level storage unit 13. Then, when there are a plurality of locations identified by a specific location name uttered by a user (case where there are a plurality of locations at different positions under the same place name), the location with a higher name recognition level is selected and a route to the selected location is set.

For example, the name recognition level storage unit 13 stores positional information of facilities such as shrine and park, and name recognition levels thereof. In addition, for example, the name recognition level is determined based on data acquired by some method such as the number of annual visitors or a result of a questionnaire.

Figure 12:
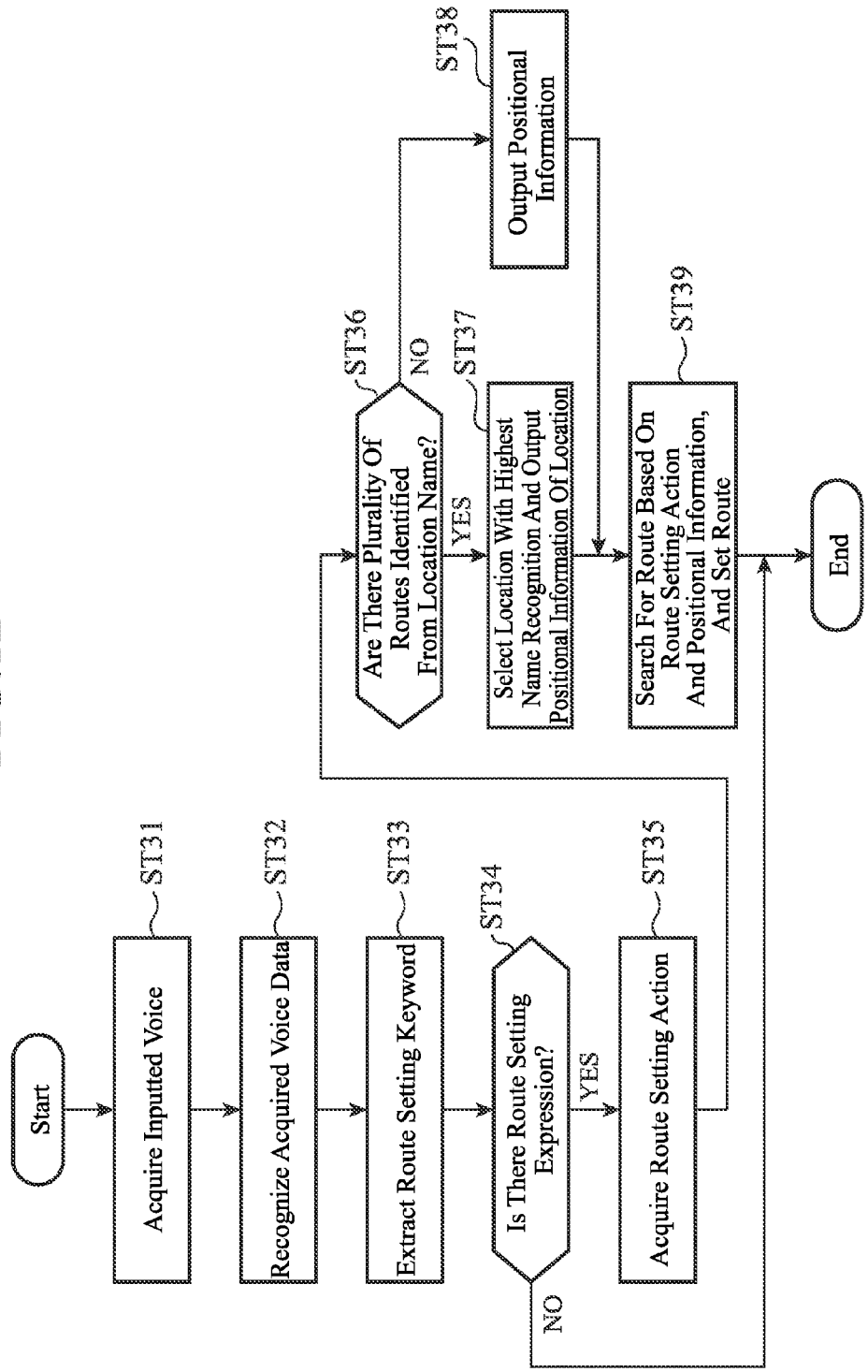
FIG. 12 is a flow chart showing an operation of the navigation device according to Embodiment 4.

Next, a description will be given of an operation of the navigation device according to Embodiment 4 configured as mentioned above. FIG. 12 is a flow chart showing the operation of the navigation device according to Embodiment 4.

Since processing of steps ST31 to ST36 are the same as that of steps ST11 to ST16 in the flow chart shown in FIG. 8 according to Embodiment 2, and descriptions thereof will be omitted. Then, in Embodiment 4, in step ST36, a location identification unit 11 decides whether or not there are the plurality of locations identified from the location name extracted in step ST33 by referring to, for example, map data stored in a map data storage unit 8; as a result, when there are the plurality of locations (case of YES in step ST36), the identification unit further refers to a name recognition level storage unit 13 to acquire name recognition levels of the plurality of locations, identifies the location with the highest name recognition, and outputs the positional information thereof (step ST37). On the other hand, when there exist no plurality of locations (case of NO in step ST36), the identification unit acquires positional information of the location, identified from the location name, from the map data, for example, and outputs the information (step ST38).

Finally, a route determination unit 10 searches for a route based on the positional information outputted in step ST37 or ST38, the route setting action acquired in step ST35, and a present position of a vehicle (mobile object) acquired by a vehicle position acquisition unit (position acquisition unit) 9, and sets the searched route (step ST39).

In an illustration by a specific example, in a similar manner to Embodiment 1, when the user utters "let's go to Kyoto Station after stopping by at Kiyomizu-dera Temple", a voice acquisition unit 1 acquires voice data of the utterance (step ST31) and a recognition result of "let's go to Kyoto Station after stopping by at Kiyomizu-dera Temple" is obtained by the voice recognition unit 2 (step ST32). Then, a keyword extraction unit 5 refers to a location name storage unit 3 as shown in FIG. 2 and a route setting expression storage unit 4 as shown in FIG. 3 to extract "Kiyomizu-dera Temple" as the location name and "stopping by" as the route setting expression corresponding to "Kiyomizu-dera Temple" and further extract "Kyoto Station" as the location name and "let's go" as the route setting expression corresponding to "Kyoto Station" (step ST33).

Then, since the route setting expressions "stopping by" and "let's go" are extracted (case of YES in step ST34), a route setting action acquisition unit 7 searches a route setting action storage unit 6 as shown in FIG. 4 using the route setting expressions "stopping by" and "let's go" as search keys, and searches route setting expressions matching the search keys to thus acquire the route setting action "set as via point" corresponding to the "stopping by" and the route setting action "set as destination" corresponding to the "let's go" (step ST35).

Thereafter, for each of the location names "Kiyomizu-dera Temple" and "Kyoto Station", the location identification unit 11 decides whether or not there are the plurality of locations identified by the specific location name (step ST36). First, with respect to the location name "Kiyomizu-dera Temple", by referring to map data, it is understood that temples named "Kiyomizu-dera Temple" exist in Kyoto Prefecture and Hyogo Prefecture. Specifically, since there are two places of the locations identified by the specific location name called this "Kiyomizu-dera Temple" (case of YES in step ST36), in order to identify one of the two, by referring to the name recognition level storage unit 13, the name recognition levels of the locations are acquired. As a result, for example, when the name recognition level is determined based on the number of annual visitors, since the information stating that the number of annual visitors of Kiyomizu-dera Temple in Kyoto Prefecture is 1,000,000 and the number of annual visitors of Kiyomizu-dera Temple in Hyogo Prefecture is 5,000 is obtained from the name recognition level storage unit 13, Kiyomizu-dera Temple in Kyoto Prefecture is identified as the place with the higher name recognition and the positional information thereof is outputted (step ST37). In addition, with respect to the location name "Kyoto Station", by referring to the map data, since the location identified from this name is one place (case of NO in step ST36), the location is identified and the positional information thereof is outputted (step ST38).

Thereafter, the route determination unit 10 searches for the route having "Kiyomizu-dera Temple" in Kyoto Prefecture as the via point and "Kyoto Station" as the destination, based on the positional information of "Kiyomizu-dera Temple" outputted in step ST37 and the route setting action of "set as via point", the positional information of "Kyoto Station" outputted in step ST38 and the route setting action of "set as destination", and the position of the vehicle (mobile object), and sets the searched route (step ST39).

Additionally, it may be configured such that whether or not the location identifying function in Embodiment 4 is used can be set by the user.

As described above, according to Embodiment 4, in addition to the advantageous effects in Embodiment 1, even when there are the plurality of locations identified from the location name uttered by the user, the locations that are highly likely to be the destination or via point are selected, and the route is set; thus, the route deviating from the user's intention can be prevented from being set.

Embodiment 5

A block diagram showing an example of a navigation device according to Embodiment 5 of the present invention has the same configuration as that of the block diagram shown in FIG. 1 according to Embodiment 1, and thus an illustration and a description thereof will be omitted. In Embodiment 5 described below, compared with Embodiment 1, the following is featured: as a result of a route searched finally by a route determination unit 10, when a total distance of the corresponding route exceeds a prescribed distance that is determined in advance, the searched route is not set.

Figure 13:
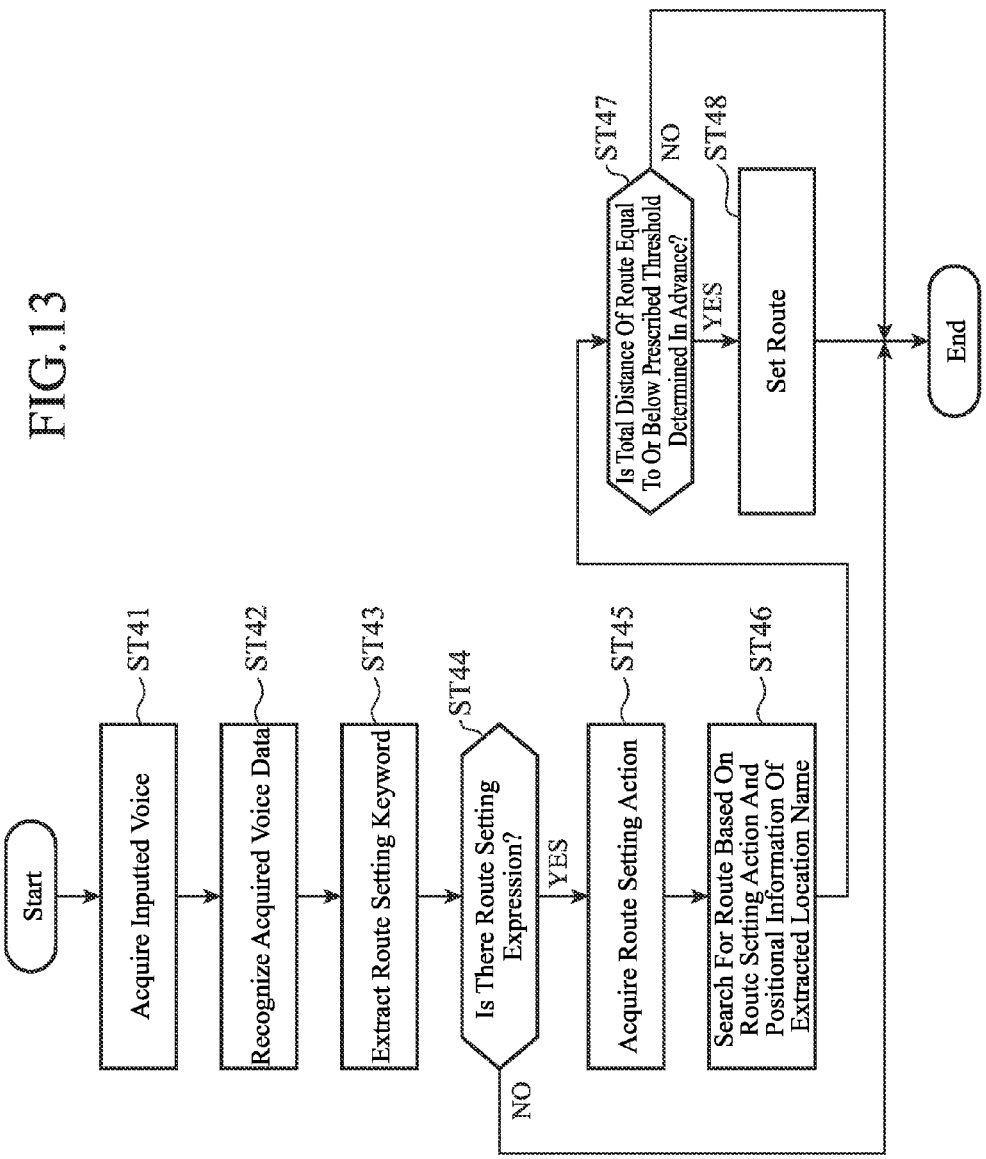
FIG. 13 is a flow chart showing an operation of a navigation device according to Embodiment 5.

FIG. 13 is a flow chart showing an operation of the navigation device according to Embodiment 5.

Since processing of steps ST41 to ST45 are the same as that of steps ST01 to ST05 in the flow chart of FIG. 5 in Embodiment 1, a description thereof will be omitted. Then, in Embodiment 5, with respect to a location name extracted by a keyword extraction unit 5, a route determination unit 10 acquires a position thereof by referring to a map data storage unit 8, and searches for a route, based on the acquired positional information, a route setting action acquired in step ST05, and a present position of the vehicle (mobile object) acquired by a vehicle position acquisition unit (position acquisition unit) 9 (step ST46), and then a decision is made of a total distance of the searched route.

A decision is made whether or not the total distance of the route searched in step ST46 is equal to or below a prescribed threshold that is determined in advance (step ST47). Then, when the total distance is equal to or below the prescribed threshold (case of YES in step ST47), the route is set (step ST48). On the other hand, in the decision of step ST47, when the total distance of the route is greater than the prescribed threshold (case of NO in step ST47), the processing is ended without setting the route.

In an illustration by a specific example, for example, similarly to Embodiment 1, when a user utters "let's go to Kyoto Station after stopping by at Kiyomizu-dera Temple", a voice acquisition unit 1 acquires voice data thereof (step ST41) and a recognition result of "let's go to Kyoto Station after stopping by at Kiyomizu-dera Temple" is obtained by a voice recognition unit 2 (step ST42). Then, the keyword extraction unit 5 refers to a location name storage unit 3 as shown in FIG. 2 and a route setting expression storage unit 4 as shown in FIG. 3 to extract "Kiyomizu-dera Temple" as the location name and "stopping by" as the route setting expression corresponding to "Kiyomizu-dera Temple" and further extract "Kyoto Station" as the location name and "let's go" as the route setting expression corresponding to "Kyoto Station" (step ST43).

Then, since the route setting expressions "stopping by" and "let's go" are extracted (case of YES in step ST44), a route setting action acquisition unit 7 searches a route setting action storage unit 6 as shown in FIG. 4 using the route setting expressions "stopping by" and "let's go" as search keys, and searches the route setting expressions matching the search keys to thus acquire the route setting action "set as via point" corresponding to "stopping by" and the route setting action "set as destination" corresponding to "let's go" (step ST45).

Thereafter, the route determination unit 10 refers to the map data storage unit 8 to acquire the positions of the location names "Kiyomizu-dera Temple" and "Kyoto Station", and searches for the route having "Kiyomizu-dera Temple" as the via point and "Kyoto Station" as the destination, based on the positional information of "Kiyomizu-dera Temple" thereof and the route setting action of "set as via point", the positional information of "Kyoto Station" and the route setting action of "set as destination", and the position of the vehicle (mobile object) (step ST46). Furthermore, the route determination unit 10 calculates a total distance of the route, based on map data and the present location. For example, when the calculated total distance is 7 km about the route from the present location and having Kiyomizu-dera Temple in Kyoto Prefecture as the via point and Kyoto Station as the destination, and the prescribed threshold that is determined in advance (maximum route distance) is 5 km, the route is not set (case of NO in step ST47). Conversely, when the prescribed threshold that is determined in advance is 10 km, the route searched in step ST46 (route with the calculated total distance of 7 km) is set (step ST48).

Additionally, it may be configured such that whether or not the total distance comparing function of the route in Embodiment 5 is used can be set by the user.

In addition, though in Embodiment 5, there is described based on Embodiment 1, similarly in Embodiments 2 to 4, it may be configured such that after the route is searched, the route is not set based on the total distance of the searched route.

As described above, according to Embodiment 5, in addition to the advantageous effects in Embodiments 1 to 4, the route which is not desired by the user and which requires an unrealistic travel distance can be prevented from being set.

Embodiment 6

Figure 14:
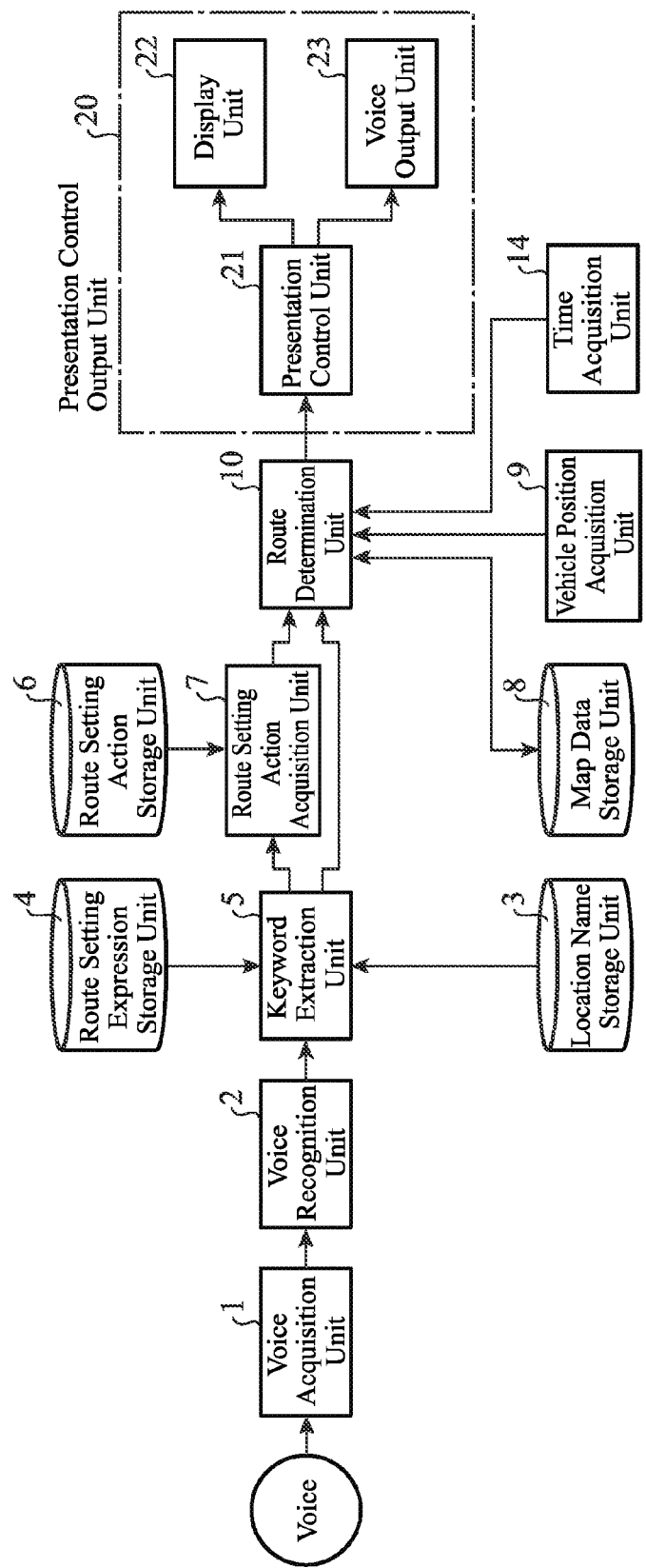
FIG. 14 is a block diagram showing an example of a navigation device according to Embodiment 6.

FIG. 14 is a block diagram showing an example of a navigation device according to Embodiment 6 of the present invention. Note that components similar to those described in Embodiments 1 to 5 are denoted by same reference numerals, and duplicated descriptions thereof will be omitted. In Embodiment 6 described below, compared with Embodiment 1, a time acquisition unit 14 not illustrated in Embodiment 1 is shown; the following is featured: a route is finally searched by a route determination unit 10; as a result, when an estimated time arriving at a destination by the corresponding route (estimated time of arrival) exceeds a prescribed time that is determined in advance, or when a required time to arrive at the destination by the corresponding route exceeds a prescribed time that is determined in advance, the searched route is not set.

The time acquisition unit 14 acquires the time using publicly known information.

Figure 15:
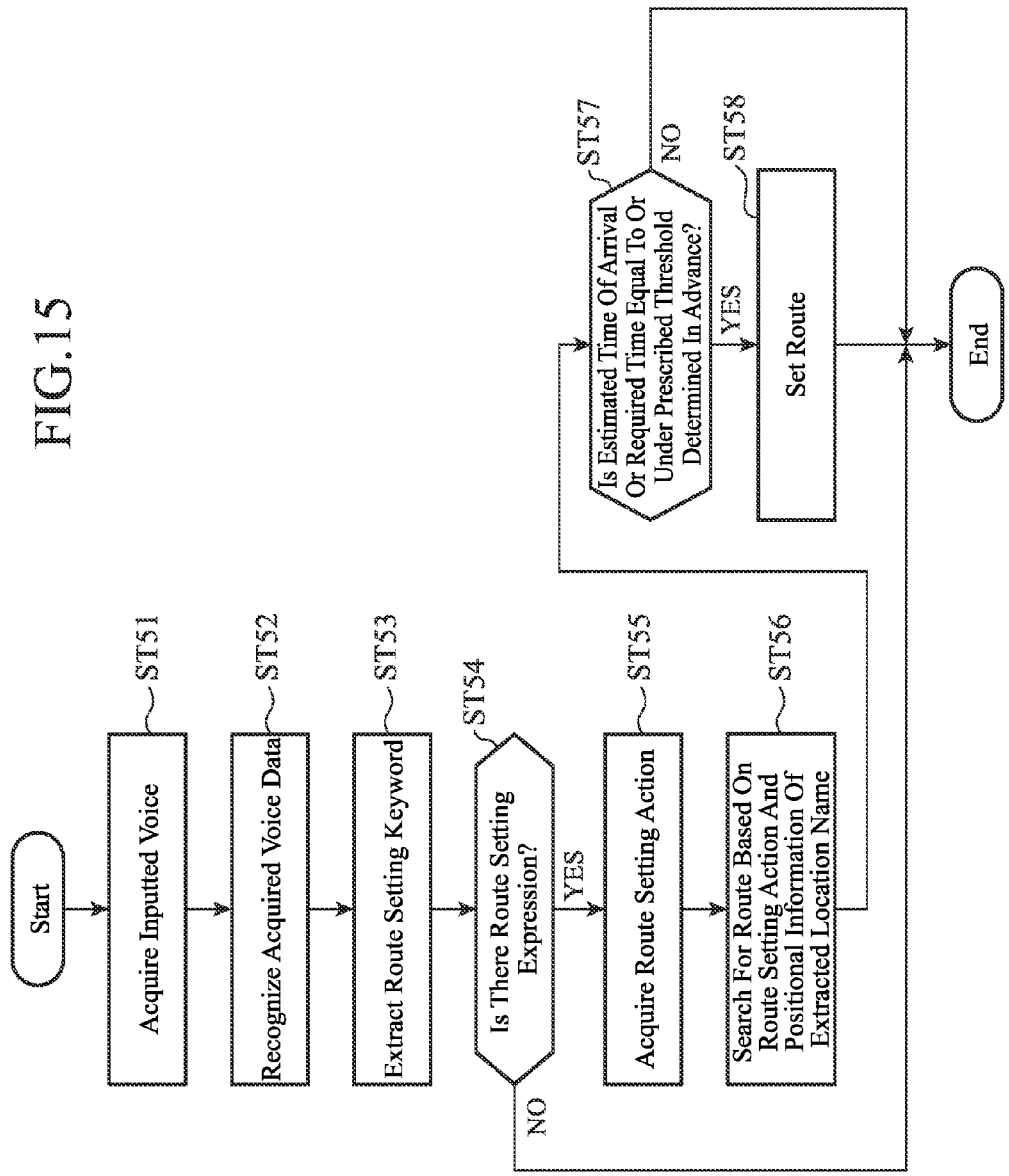
FIG. 15 is a flow chart showing an operation of the navigation device according to Embodiment 6.

FIG. 15 is a flowchart showing an operation of the navigation device according to Embodiment 6.

Since processing of steps ST51 to ST56 are the same as that of steps ST41 to ST46 in the flow chart shown in FIG. 12 according to Embodiment 5, a description thereof will be omitted. Then, with respect to a route searched in step ST56, a decision is made whether or not an estimated time of arrival at the destination by the route is equal to or under a prescribed threshold, or whether or not a required time to arrive at the destination by the route is equal to or under a prescribed threshold (step ST57). Thereafter, when the estimated time of arrival is equal to or under the prescribed threshold, or when the required time is equal to or under the prescribed threshold (case of YES in step ST57), the route is set (step ST58). On the other hand, in the decision of step ST57, when the estimated time of arrival is after the prescribed threshold, or when the required time to the destination is greater than the prescribed threshold (case of NO in step ST57), the process is ended without setting the route.

In an illustration by a specific example, for example, similarly to Embodiment 1, when a user utters "let's go to Kyoto Station after stopping by at Kiyomizu-dera Temple", a voice acquisition unit 1 acquires voice data thereof (step ST51), and a recognition result of "let's go to Kyoto Station after stopping by at Kiyomizu-dera Temple" is obtained by a voice recognition unit 2 (step ST52). Then, a keyword extraction unit 5 refers to a location name storage unit 3 as shown in FIG. 2 and a route setting expression storage unit 4 as shown in FIG. 3 to extract "Kiyomizu-dera Temple" as the location name and "stop by" as the route setting expression corresponding to "Kiyomizu-dera Temple" and further extract "Kyoto Station" as the location name and "let's go" as the route setting expression corresponding to "Kyoto Station" (step ST53).

Then, since the route setting expressions "stopping by" and "let's go" are extracted (case of YES in step ST54), a route setting action acquisition unit 7 searches a route setting action storage unit 6 as shown in FIG. 4 using the route setting expressions "stopping by" and "let's go" as search keys, and searches the route setting expressions matching the search keys to thus acquire the route setting action "set as via point" corresponding to "stopping by" and the route setting action "set as destination" corresponding to "let's go" (step ST55).

Thereafter, the route determination unit 10 refers to a map data storage unit 8 to acquire the positions of the location names "Kiyomizu-dera Temple" and "Kyoto Station", and searches for the route having "Kiyomizu-dera Temple" as the via point and "Kyoto Station" as the destination, based on the positional information of "Kiyomizu-dera Temple" thereof and the route setting action of "set as via point", the positional information of "Kyoto Station" and the route setting action of "set as destination", and a position of a vehicle (mobile object) (step ST56). Furthermore, the route determination unit 10 calculates the estimated time of arrival at Kyoto Station that is the destination by the route, based on the time acquired by the time acquisition unit 14, map data, present location, and the like. For example, when the calculated estimated time of arrival at Kyoto Station using the route from the present location and having Kiyomizu-dera Temple in Kyoto Prefecture as the via point and Kyoto Station as the destination is 18:10 and the prescribed threshold that is determined in advance is 18:00, this route is not set (case of NO in step ST57). Conversely, when the prescribed threshold that is determined in advance is 18:30, the route searched in step ST56 is set (step ST58).

Alternatively, the time compared in step ST57 may be the required time to the destination instead of the estimated time of arrival. In this case, in step ST56, after the route determination unit 10 searches for the route having "Kiyomizu-dera Temple" as the via point and "Kyoto Station" as the destination, the required time to arrive at Kyoto Station that is the destination using the route is calculated based on the map data, present location, and the like. For example, when the calculated required time to arrive at Kyoto Station using the route from the present location and having Kiyomizu-dera Temple in Kyoto Prefecture as the via point and Kyoto Station as the destination is 1 hour and 30 minutes, and the prescribed threshold that is determined in advance is 1 hour, this route is not set (case of NO in step ST57). Conversely, when the prescribed threshold that is determined in advance is 2 hours, the route searched in step ST56 is set (step ST58).

Additionally, it may be configured such that whether or not the comparing function of the estimated time of arrival or the required time to the destination of the route in Embodiment 6 is used can be set by the user.

Moreover, though in Embodiment 6, there is described based on Embodiment 1, similarly in Embodiments 2 to 4, it may be configured such that after the route is searched, the route is not set based on the estimated time of arrival or the required time to the destination of the searched route.

As described above, according to Embodiment 6, in addition to the advantageous effects in Embodiments 1 to 4, the route which is not desired by the user and which requires an unrealistic time can be prevented from being set.

Embodiment 7

A block diagram showing an example of a navigation device according to Embodiment 7 of the present invention has the same configuration as that of the block diagram shown in FIG. 1 in Embodiment 1, and thus an illustration and a description thereof will be omitted. In Embodiment 7 described below, compared with Embodiment 1, when a route has already been set, a location identified from a location name is added as a "via point" and a route is re-searched regardless of the contents of a route setting action.

Figure 16:
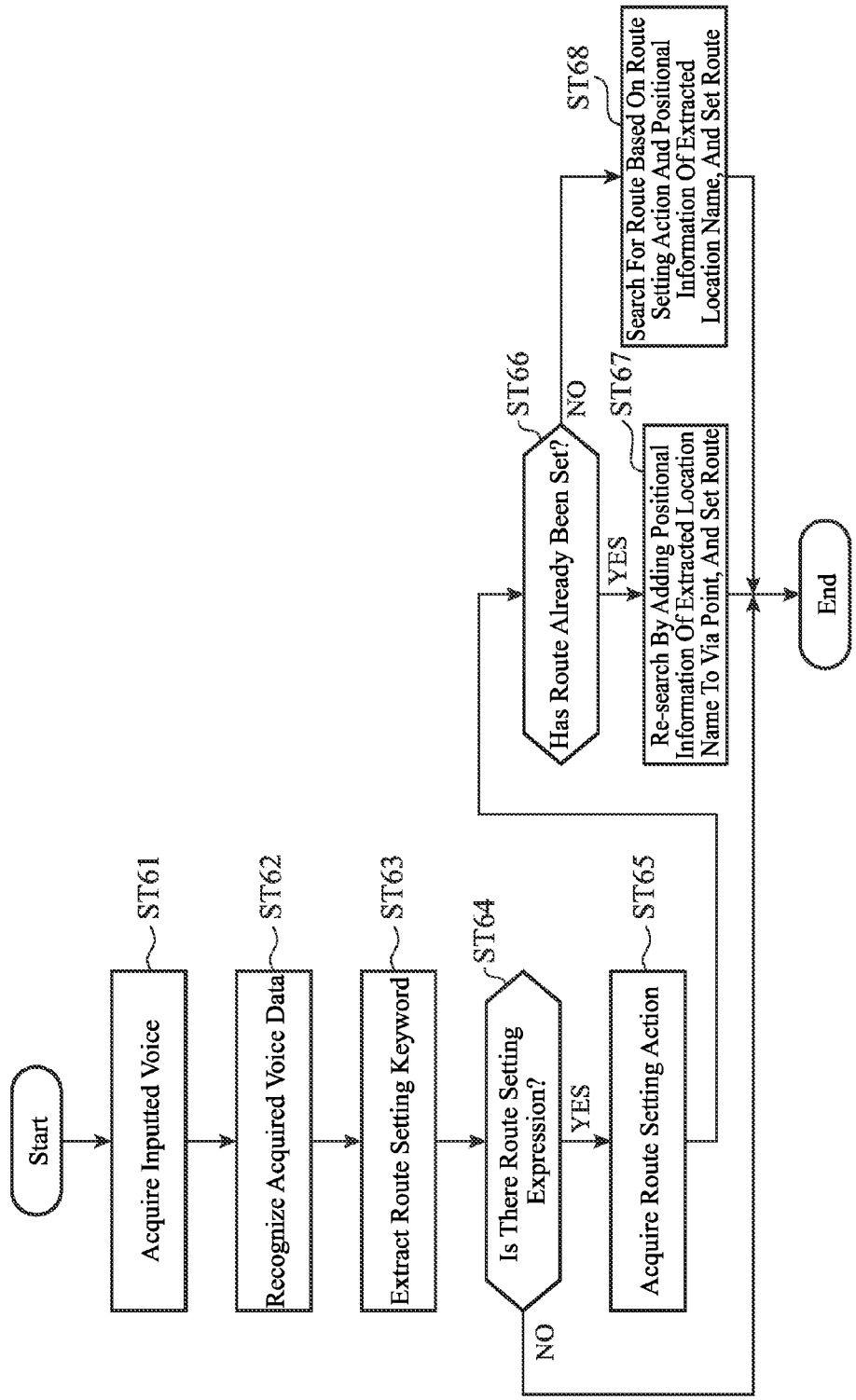
FIG. 16 is a flow chart showing an operation of a navigation device according to Embodiment 7.

FIG. 16 is a flow chart showing an operation of the navigation device according to Embodiment 7.

Since processing of steps ST61 to ST65 are the same as that of steps ST01 to ST05 in the flow chart of FIG. 5 according to Embodiment 1, a description thereof will be omitted. Then, in Embodiment 7, after a route setting action is acquired in step ST65, a route determination unit 10 decides whether or not a route has already been set (step ST66). At this stage, if the route has already been set (case of YES in step ST66), with respect to a location name extracted by a keyword extraction unit 5, a position thereof is acquired by referring to map data, for example; the acquired positional information is "added to via points" and the route is re-searched, regardless of the contents of the route setting action acquired by the route setting action acquisition unit 7 in step ST65, and the corresponding route is set (step ST67). On the other hand, if the route has not been set (case of NO in step ST66), in a similar manner to step ST06 in the flow chart of FIG. 5 in Embodiment 1, with respect to the location name extracted by the keyword extraction unit 5, a position thereof is acquired by referring to map data, a route is searched based on the acquired positional information, the route setting action acquired in step ST65, and a present position of a vehicle (mobile object) acquired by a vehicle position acquisition unit (position acquisition unit) 9, and the searched route is set (step ST68).

In an illustration by a specific example, for example, when a user utters "go to Yasaka-jinja Shrine" in a state where a route having Kiyomizu-dera Temple in Kyoto Prefecture as a via point and Kyoto Station as a destination has already been set, a voice acquisition unit 1 acquires the voice data (step ST61) and a recognition result of "go to Yasaka-jinja Shrine" is obtained by a voice recognition unit 2 (step ST62). In addition, by referring to a location name storage unit 3 as shown in FIG. 2 and a route setting expression storage unit 4 as shown in FIG. 3, the keyword extraction unit 5 extracts "Yasaka-jinja Shrine" as the location name and "go" as a route setting expression corresponding to "Yasaka-jinja Shrine" (step ST63).

Then, since the route setting expression "go" is extracted (case of YES in step ST64), a route setting action acquisition unit 7 searches a route setting action storage unit 6 as shown in FIG. 4 using the route setting expression "go" as a search key, and searches the route setting expression matching the search key to thus acquire the route setting action "set as destination" corresponding to "go" (step ST65). Thereafter, the route determination unit 10 decides whether or not the route has already been set (step ST66).

At this stage, since the route has already been set (case of YES in step ST66), the route determination unit 10 refers to a map data storage unit 8 to acquire the position of the location name "Yasaka-jinja Shrine", re-searches for the route by "adding to via points" the position of the Yasaka-jinja Shrine, and sets the corresponding route, regardless of the route setting action of "set as destination" acquired in step ST65 (step ST67). In other words, Yasaka-jinja Shrine is added to the via point, instead of being set as the destination, and the route having Kyoto Station as the destination via Kiyomizu-dera Temple in Kyoto Prefecture and also via Yasaka-jinja Shrine is re-searched, and the corresponding route is set.

Moreover, though in this embodiment, there is described such that when the route has already been set, the location of the location name extracted by the keyword extraction unit 5 is always added to the via point, for example, a conditional configuration may be adopted such that the location of the extracted location name is added to the via point when the position of the location name is in a vicinity (for example, within a radius of 500 m) of the present position of the vehicle (mobile object).

Additionally, it may be configured such that whether or not the decision function for route guidance expression suitability in Embodiment 7 is used can be set by the user.

Moreover, though in Embodiment 7, there is described based on Embodiment 1, similarly in Embodiments 2 to 4, it may be configured such that when the route has already been set, the position of the acquired location name is added as the via point, regardless of the acquired route setting action.

As described above, according to Embodiment 7, in addition to the advantageous effects in Embodiments 1 to 6, the destination that has already been set can be prevented from being needlessly changed, and the place desirably visited on the way can be additionally set to the via point efficiently. Also, an operation for additionally setting the via point by hand is no longer required.

Embodiment 8

A block diagram showing an example of a navigation device according to Embodiment 8 of the present invention has the same configuration as that of the block diagram shown in FIG. 1 according to Embodiment 1, and thus an illustration and a description thereof will be omitted. In Embodiment 8 described below, compared with Embodiment 1, a route setting expression storage unit 4 also includes an expression representing a point in time, and a keyword extraction unit 5 also extracts the expression representing the point in time; when the corresponding expression is not the one representing "today", in other words, when it is the one representing the future point in time that is equal to or beyond a prescribed time, a route is not set.

FIG. 17 is a diagram showing an example of the route setting expression storage unit 4 in Embodiment 8. As shown in this figure, similarly to FIG. 3, the route setting expression storage unit 4 stores action expressions such as "want to go", "stop by", and "take a rest" as route setting expressions related to route setting actions in a similar manner to FIG. 3, and also stores route setting expressions representing the points in time such as "today", tomorrow", and "next time".

Figure 18:
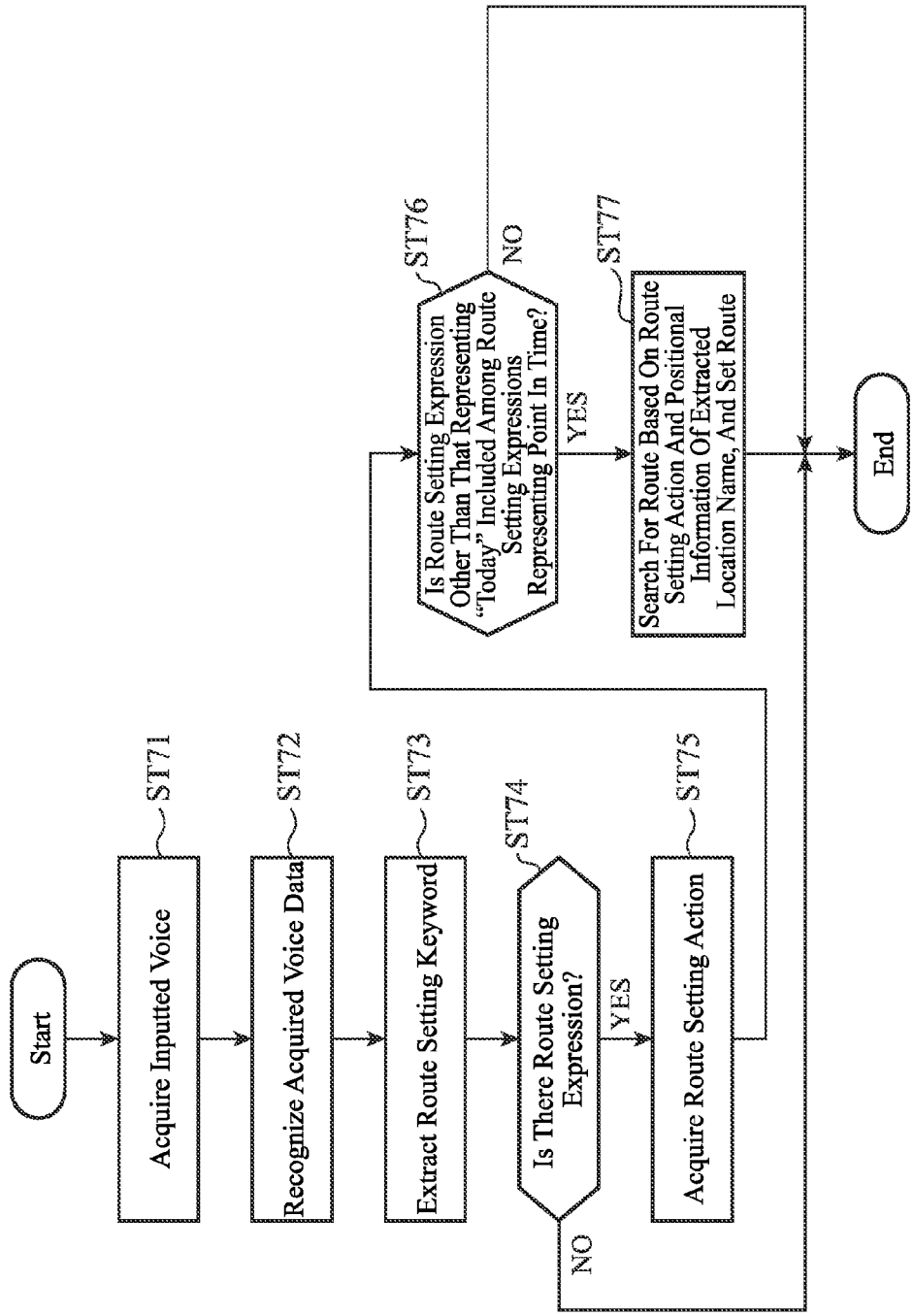
FIG. 18 is a flow chart showing an operation of a navigation device according to Embodiment 8.

FIG. 18 is a flow chart showing an operation of the navigation device according to Embodiment 8.

Since processing of steps ST71 to ST75 are the same as that of steps ST01 to ST05 in the flow chart shown of FIG. 5 in Embodiment 1, a description thereof will be omitted. Then, in Embodiment 8, after the route setting action is acquired in step ST75, the route determination unit 10 decides whether or not the expression other than the one representing "today" is included, in other words, whether or not the expression representing a future point in time that is equal to or beyond a prescribed time is included, in the route setting expressions representing the points in time among the expressions extracted by the keyword extraction unit 5 in step ST73 (step ST76).

At this stage, if the expression other than that describing "today" is not included (case of YES in step ST76), in a similar manner to step ST06 in the flow chart of FIG. 5 in Embodiment 1, with respect to a location name extracted by the keyword extraction unit 5, a position thereof is acquired by referring to map data, and a route is searched, based on the acquired positional information, the route setting action acquired in step ST75, and a present position of a vehicle (mobile object) acquired by a vehicle position acquisition unit (position acquisition unit) 9, and the searched route is set (step ST77).

On the other hand, in the decision of step ST76, when the expression other than the one representing "today" such as the expression representing "tomorrow", "next time", or "next month", in other words, the expression representing the future point in time that is equal to or beyond the prescribed time, is included (case of NO in step ST76), it is decided that an utterance is made on a future event that is equal to or beyond the prescribed time, and the processing is ended without setting the route.

In an illustration by a specific example, when the user utters "I'm going to Kyoto Station tomorrow", for example, a voice acquisition unit 1 acquires voice data thereof (step ST71), and a recognition result of "I'm going to Kyoto Station tomorrow" is obtained by a voice recognition unit 2 (step ST72). Then, by referring to a location name storage unit 3 as shown in FIG. 2 and a route setting expression storage unit 4 as shown in FIG. 3, the keyword extraction unit 5 extracts "Kyoto Station" as a location name and "tomorrow" and "go" as route setting expressions corresponding to "Kyoto Station" (step ST73).

Then, since the route setting expression "go" is extracted (case of YES in step ST74), a route setting action acquisition unit 7 searches a route setting action storage unit 6 as shown in FIG. 4 using the route setting expression "go" as a search key, and searches an expression matching the search key to thus acquire a route setting action "set as destination" corresponding to "go" (step ST75). Thereafter, the route determination unit 10 decides whether or not an expression other than that describing "today" is included in the route setting expressions representing the points in time (step ST76). At this stage, since the route setting expression representing the point in time is an expression representing "tomorrow" which is the one other than the expression representing "today", in other words, an expression representing the future point in time that is equal to or beyond the prescribed time (case of NO in step ST76), it is decided that an utterance is made regarding the future matter that is equal to or beyond the prescribed time, and the processing is ended without setting the route.

Moreover, though in this embodiment, there is described such that the route setting expression storage unit 4 also stores the expressions representing the points in time, a time expression storage unit may be provided separate from the route setting expression storage unit 4 as shown in FIG. 3.

Furthermore, since it is considered unlikely that one would take the trouble of uttering "today" when talking about a place that is about to go now in an ordinary conversation, it is configured such that the decision is made of "whether or not an expression other than that representing "today" is included" in step ST76; however, it may be configured that the decision is made of "whether or not an expression representing "today" such as "today" and "from now" is included".

Additionally, it may be configured such that whether the following function is used or not is set by the user: the decision is made of whether or not an expression other than that representing "today" is included in the expressions representing the points in time.

Moreover, though in Embodiment 8, there is described based on Embodiment 1, similarly in Embodiments 2 to 7, it may be configured such that when the expression representing the point in time is an expression other than that describing "today", in other words, an expression representing the future point in time that is equal to or beyond the prescribed time, the route setting is not performed.

As described above, according to Embodiment 8, in addition to the advantageous effects in Embodiments 1 to 7, a route not desired by the user at the present moment can be prevented from being set, for example, in a case where the user simply makes an utterance about a future event.

Embodiment 9

Figure 19:
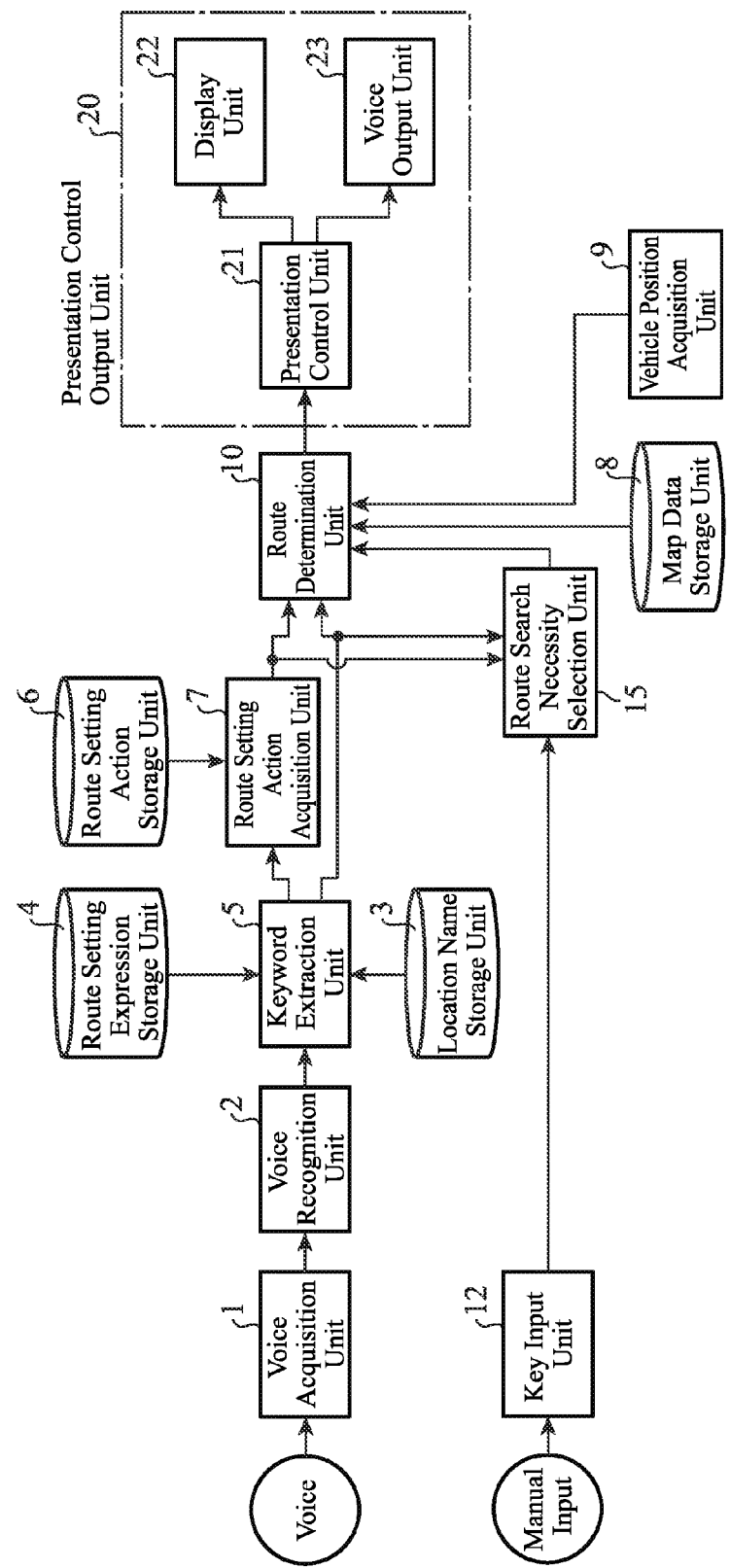
FIG. 19 is a block diagram showing an example of a navigation device according to Embodiment 9.

FIG. 19 is a block diagram showing an example of a navigation device according to Embodiment 9 of the present invention. Note that components similar to those described in Embodiments 1 to 8 are denoted by same reference numerals, and duplicated descriptions thereof will be omitted. In Embodiment 9 described below, compared with Embodiment 1, a route search necessity selection unit 15 is further provided, and a key input unit 12 not illustrated in Embodiment 1 is shown. Then, it is configured that whether or not a route is searched can be selected by a user.

Based on a location name extracted by a keyword extraction unit 5 and a route setting action corresponding to the location, the route search necessity selection unit 15 presents "whether or not the route is searched" to the user in a manner, for example, displaying it on a screen or voice outputting it, and enables the user to select a necessity of a route search.

Figure 20:
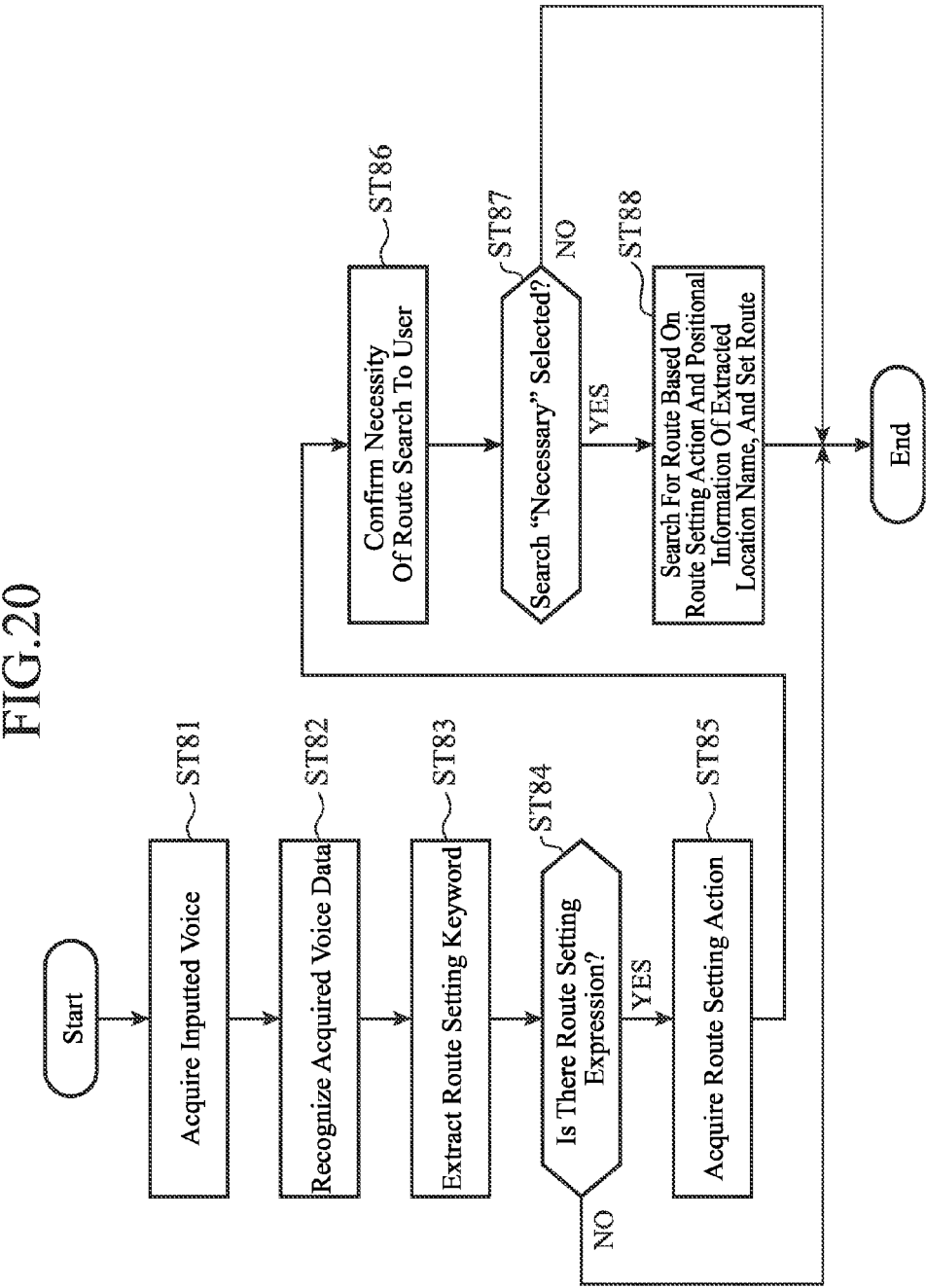
FIG. 20 is a flowchart showing an operation of the navigation device according to Embodiment 9.

FIG. 20 is a flow chart showing an operation of the navigation device according to Embodiment 9.

Since processing of steps ST81 to ST85 are the same as that of steps STO1 to STO5 in the flow chart shown in FIG. 5 according to Embodiment 1, a description thereof will be omitted. Then, in Embodiment 9, the route search necessity selection unit 15 performs a necessity confirmation of whether or not a route is searched from the location name extracted by the keyword extraction unit 5 and the route setting action (step ST86). As a method of the necessity confirmation, while a table in which location names and route setting actions are associated with one another as shown in FIG. 6 is displayed, a button and so on for selecting the necessity of the route search may be presented to the user, or it may be presented to the user by voice.

Then, when a search "necessary" is selected by the user (case of YES in step ST87), in a similar manner to step ST06 in the flow chart of FIG. 5 in Embodiment 1, with respect to the location name extracted by the keyword extraction unit 5, a position thereof is acquired by referring to map data, the route is searched, based on the acquired positional information, the route setting action acquired in step ST85, and a present position of a vehicle (mobile object) acquired by the vehicle position acquisition unit (position acquisition unit) 9, and the searched route is set (step ST88).

On the other hand, when a search "not necessary" is selected by the user (case of NO in step ST87), the processing is ended as it is.

In an illustration by a specific example, for example, in a similar manner to Embodiment 1, when the user utters "let's go to Kyoto Station after stopping by at Kiyomizu-dera Temple", a voice acquisition unit 1 acquires voice data thereof (step ST81) and a recognition result of "let's go to Kyoto Station after stopping by at Kiyomizu-dera Temple" is obtained by a voice recognition unit 2 (step ST82). Then, a keyword extraction unit 5 refers to a location name storage unit 3 as shown in FIG. 2 and a route setting expression storage unit 4 as shown in FIG. 3 to extract "Kiyomizu-dera Temple" as a location name and "stopping by" as a route setting expression corresponding to "Kiyomizu-dera Temple" and further extract "Kyoto Station" as a location name and "let's go" as a route setting expression corresponding to "Kyoto Station" (step ST83).

Then, since the route setting expressions "stopping by" and "let's go" are extracted (case of YES in step ST84), the route setting action acquisition unit 7 searches the route setting action storage unit 6 as shown in FIG. 4 using the route setting expressions "stopping by" and "let's go" as search keys, and searches route setting expressions matching the search keys to thus acquire the route setting action "set as via point" corresponding to "stopping by" and the route setting action "set as destination" corresponding to "let's go" (step ST85).

At this stage, the route search necessity selection unit 15 confirms necessity of a route selection with the user by, for example, displaying an extracted location name and a route setting action, and also presenting a dialog that allows the user to select the necessity of a route search as shown in FIG. 21 (step ST86). Then, when the user selects "YES" using the key input unit 12 (case of YES in step ST87), the route determination unit 10 refers to a map data storage unit 8 to acquire positions of location names "Kiyomizu-dera Temple" and "Kyoto Station", and searches for a route having "Kiyomizu-dera Temple" as a via point and "Kyoto Station" as a destination, based on positional information of "Kiyomizu-dera Temple" and a route setting action of "set as via point", positional information of "Kyoto Station" and a route setting action of "set as destination", and the position of the vehicle (mobile object), and sets the searched route (step ST88).

On the other hand, when the user selects "NO" (case of NO in step ST87), the processing is ended without executing processing searching for and setting the route.

Moreover, as the method of the necessity confirmation in step ST86, other methods may be used such as presenting the user with an option of "Do you wish to search for a route to Kyoto Station via Kiyomizu-dera Temple?" by voice. In such a way, when the presentation is made to the user by the voice output, the route may be searched and set if the user utters "YES", while the processing may be ended as it is if the user utters "NO".

Additionally, it may be configured that whether or not the function for route search necessity confirmation in Embodiment 9 is used can be set by the user.

Moreover, though in Embodiment 9, there is described based on Embodiment 1, similarly in Embodiments 2 to 8, it may be configured to confirm the necessity of the route search.

As described above, according to Embodiment 9, in addition to the advantageous effects in Embodiments 1 to 8, a route not desired by the user can be prevented from being searched and set.

Embodiment 10

A block diagram showing an example of a navigation device according to Embodiment 10 of the present invention has the same configuration as that of the block diagram shown in FIG. 1 according to Embodiment 1, and thus an illustration and a description thereof will be omitted. In Embodiment 10 described below, compared with Embodiment 1, when a plurality of routes are searched, a route determination unit 10 presents these routes to the user.

The route determination unit 10 in Embodiment 10 decides whether or not there are a plurality of routes to be searched, searches for these routes if there are the plurality of routes to be searched, and presents these routes to the user.

FIG. 22 is a flow chart showing an operation of the navigation device according to Embodiment 10.

Since processing of steps ST91 to ST95 are the same as that of steps STO1 to STO5 in the flow chart shown in FIG. 5 according to Embodiment 1, a description thereof will be omitted. Then, in Embodiment 10, the route determination unit 10 decides whether or not there are the plurality of routes to be searched (step ST96), and if there are the plurality of routes (case of YES in step ST96), with respect to a location name extracted by a keyword extraction unit 5, a position thereof is acquired by referring to map data, and all routes are searched based on the acquired positional information, a route setting action acquired in step ST95, and a present position of a vehicle (mobile object) acquired by a vehicle position acquisition unit (position acquisition unit) 9 (step ST97). Then, an instruction is issued to the presentation control unit 21 to present the plurality of searched routes to the user and the searched routes are presented through the display unit 22 or the voice output unit 23 (step ST98). Then, the route selected by the user is set (step ST99).

On the other hand, in the decision of step ST96, when there is only one route instead of the plurality of routes to be searched (case of NO in step ST96), in a similar manner to step ST06 in the flow chart of FIG. 5 in Embodiment 1, with respect to the location name extracted by the keyword extraction unit 5, a position thereof is acquired by referring to map data, and the route is searched based on the acquired positional information, the route setting action acquired in step ST95, and the present position of the vehicle (mobile object) acquired by the vehicle position acquisition unit (position acquisition unit) 9, and the searched route is set (step ST100).

In an illustration by a specific example, let us assume that the following conversation is made among a plurality of users: A "I want to go to Kyoto Station via Kiyomizu-dera Temple." and B "Let's see, I'd like to go to Kyoto Station via Kiyomizu-dera Temple and Sanjusangen-do Temple." As a result, a voice acquisition unit 1 acquires voice data thereof (step ST91), and recognition results of A "I want to go to Kyoto Station via Kiyomizu-dera Temple", and B "let's see, I'd like to go to Kyoto Station via Kiyomizu-dera Temple and Sanjusangen-do Temple" are obtained by a voice recognition unit 2 (step ST92). Then, the keyword extraction unit 5 refers to a location name storage unit 3 as shown in FIG. 2 and a route setting expression storage unit 4 as shown in FIG. 3 to extract "Kiyomizu-dera Temple" as the location name and "via" as a route setting expression corresponding to "Kiyomizu-dera Temple" and also extract "Kyoto Station" as the location name and "want to go" as the route setting expression corresponding to "Kyoto Station" from the recognition result of A. Further, the extraction unit extracts "via" as the route setting expression corresponding to the location names "Kiyomizu-dera Temple" and "Sanjusangen-do Temple", and also extracts "want to go" as the route setting expression corresponding to the location name "Kyoto Station" from the recognition result of B (Step ST93).

Then, since the route setting expressions "via" and "want to go" re extracted (case of YES in step ST94), a route setting action acquisition unit 7 searches a route setting action storage unit 6 as shown in FIG. 4 using the route setting expressions "via" and "want to go" as search keys, and searches the route setting expressions matching the search keys to thus acquire the route setting action "set as via point" corresponding to "via" and the route setting action "set as destination" corresponding to "want to go" (step ST95).

In this case, as shown in FIG. 23, there exist two kinds of routes by information (number 1) acquired from the recognition result of A, and information (number 2) acquired from the recognition result of B. Therefore, it is decided that there are two (plural) routes to be searched (case of YES in step ST96). Thus, with respect to the recognition result of A, the route determination unit 10 refers to a map data storage unit 8 to acquire positions of the location names "Kiyomizu-dera Temple" and "Kyoto Station", and searches for the route having "Kiyomizu-dera Temple" as the via point and "Kyoto Station" as the destination, based on positional information of the "Kiyomizu-dera Temple" and the route setting action of "set as via point" thereof, positional information of "Kyoto Station" and the route setting action of "set as destination" thereof, and the position of the vehicle (mobile object), and with respect to the recognition result of B, the determination unit also acquires positions of the location names "Kiyomizu-dera Temple", "Sanjusangen-do Temple", and "Kyoto Station", and searches for the route having "Kiyomizu-dera Temple" and "Sanjusangen-do Temple" as the via points and "Kyoto Station" as the destination, based on positional information of "Kiyomizu-dera Temple" and the route setting action of "set as via point" thereof, positional information of "Sanjusangen-do Temple" and the route setting action of "set as via point" thereof, positional information of "Kyoto Station" and the route setting action of "set as destination" thereof, and the position of the vehicle (mobile object) (step ST97).

Then, for example, by displaying a table as shown in FIG. 23 on a display screen, displaying routes on a map displayed on the display screen, and so on, the plurality of routes searched in step ST97 are presented to the user (step ST98). Then, when the route to be desirably selected by the user is selected by, for example, inputting a number displayed in the table, touching the route displayed on the map, and so on, the route determination unit 10 sets the route selected by the user (step ST99).

In addition, as another example, a configuration is adopted such that when the route setting expression storage unit 4 also stores correcting expressions, the keyword extraction unit 5 extracts the location name following the correcting expression such as "instead of" or "canceling".

FIG. 24 is a diagram showing an example of the route setting expression storage unit 4 according to Embodiment 10. As shown in FIG. 24, the route setting expression storage unit 4 stores action expressions such as "want to go", "stop by", and "take a rest" in a similar manner to FIG. 17 as the route setting expressions related to the route setting actions, stores the route setting expressions representing points in time such as "today", tomorrow", and "next time", and also stores correcting expressions/canceling expressions such as "instead of", "canceling", "cancel", "let's cancel", and "delete" as the route setting expressions.

With respect to this case, in an illustration by a specific example, let us assume that the following conversation is made among users: A "I want to go to Kyoto Station via Kiyomizu-dera Temple." and B "Let's see, I'd like to go to Kyoto Station via Sanjusangen-do Temple instead of Kiyomizu-dera Temple." As a result, the voice acquisition unit 1 acquires voice data thereof (step ST91), and recognition results of A "I want to go to Kyoto Station via Kiyomizu-dera Temple." and B "Let's see, I'd like to go to Kyoto Station via Sanjusangen-do Temple instead of Kiyomizu-dera Temple." are obtained by the voice recognition unit 2 (step ST92). Then, the keyword extraction unit 5 refers to the location name storage unit 3 as shown in FIG. 2 and the route setting expression storage unit 4 as shown in FIG. 24 to extract "Kiyomizu-dera Temple" as the location name and "via" as the route setting expression corresponding to "Kiyomizu-dera Temple" and also extract "Kyoto Station" as the location name and "want to go" as the route setting expression corresponding to "Kyoto Station" from the recognition result of A. Further, from the recognition result of B, the extraction unit extracts "Sanjusangen-do Temple" as the location name following "instead of" that is the correcting expression and "via" as the route setting expression corresponding to "Sanjusangen-do Temple Temple", and extracts "Kyoto Station" as the location name and "want to go" as the route setting expression corresponding to "Kyoto Station" (Step ST93).

Then, since the route setting expressions "via" and "want to go" are extracted (case of YES in step ST94), the route setting action acquisition unit 7 searches the route setting action storage unit 6 as shown in FIG. 4 using the route setting expressions "via" and "want to go" as the search keys, and searches for the route setting expressions matching the search keys to thus acquire the route setting action "set as via point" corresponding to "via" and the route setting action "set as destination" corresponding to "want to go" (step ST95).

In this case, as shown in FIG. 25, there exist two kinds of routes by information (number 1) acquired from the recognition result of A, and information (number 2) acquired from the recognition result of B. Therefore, it is decided that there are two (plural) routes to be searched (case of YES in step ST96). Thus, with respect to the recognition result of A, the route determination unit 10 refers to the map data storage unit 8 to acquire positions of the location names "Kiyomizu-dera Temple" and "Kyoto Station", and searches for the route having "Kiyomizu-dera Temple" as the via point and "Kyoto Station" as the destination, based on positional information of the "Kiyomizu-dera Temple" and the route setting action of "set as via point" thereof, positional information of "Kyoto Station" and the route setting action of "set as destination" thereof, and the position of the vehicle (mobile object), and with respect to the recognition result of B, the determination unit also refers to the map data storage unit 8 to acquire positions of the location names "Sanjusangen-do Temple" and "Kyoto Station" and searches for the route having "Kiyomizu-dera Temple" and "Sanjusangen-do Temple" as the via points and "Kyoto Station" as the destination, based on positional information of "Sanjusangen-do Temple" and the route setting action of "set as via point", positional information of "Kyoto Station" and the route setting action of "set as destination", and the position of the vehicle (mobile object) (step ST97).

Then, for example, by displaying a table as shown in FIG. 25 on a display screen, displaying routes on a map displayed on the display screen, and so on, the plurality of routes searched in step ST97 are presented to the user (step ST98). Then, the route to be desirably selected by the user is selected by, for example, inputting a number displayed in the table, touching the route displayed on the map, and so on, the route determination unit 10 sets the route selected by the user (step ST99).

Moreover, though in Embodiment 10, there is described based on Embodiment 1, similarly in Embodiments 2 to 9, it may be configured such that when the plurality of routes are searched, these are presented.

As described above, according to Embodiment 10, in addition to the advantageous effects in Embodiments 1 to 9, since it becomes unnecessary to set the plurality of routes by hand, and the user can confirm and select a plurality of route candidates presented, thereby improving a convenience thereof.

Embodiment 11

A block diagram showing an example of a navigation device according to Embodiment 11 of the present invention has the same configuration as that of the block diagram shown in FIG. 1 according to Embodiment 1, and thus an illustration and a description thereof will be omitted. In Embodiment 11 described below, similarly to Embodiment 10, a case where a plurality of routes are searched is assumed; compared with Embodiment 10, in a case where a canceling expression such as deleting a location set in a route is extracted, a route determination unit 10 searches for a new route in which the location is deleted from the route to be set.

Ina similar manner to the one as shown in FIG. 24, for example, a route setting expression storage unit 4 in Embodiment 11 includes correcting expressions/canceling expressions, in addition to expressions representing route setting actions and expressions representing points in time. In addition, a keyword extraction unit 5 also extracts these correcting expressions/canceling expressions.

Figure 26:
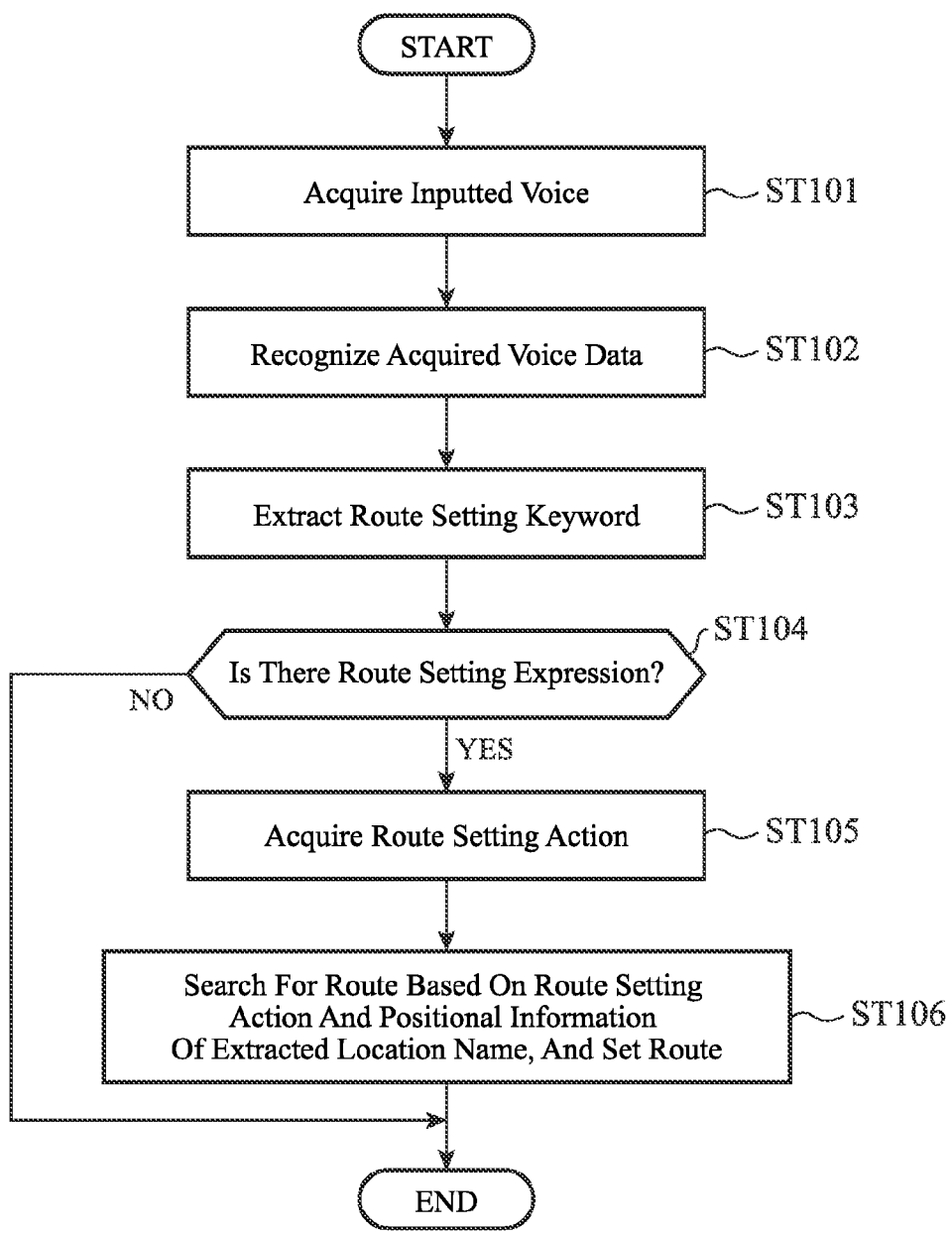
FIG. 26 is a flow chart showing an operation of a navigation device according to Embodiment 11.

FIG. 26 is a flow chart showing an operation of the navigation device according to Embodiment 11. Since the flow chart is the same as that of FIG. 5 in Embodiment 1, a description thereof will be given by a specific example while omitted of the steps.

For example, let us assume that the following conversation is made by users: A "I want to go to Kyoto Station via Kiyomizu-dera Temple.", B "Let's see, I'd like to go to Kyoto Station via Kiyomizu-dera Temple and Sanjusangen-do Temple.", and C "Let's cancel Sanjusangen-do Temple, after all." As a result, a voice acquisition unit 1 acquires voice data thereof (step ST101), and recognition results of A "I want to go to Kyoto Station via Kiyomizu-dera Temple.", B "Let's see, I'd like to go to Kyoto Station via Kiyomizu-dera Temple and Sanjusangen-do Temple.", and C "Let's cancel Sanjusangen-do Temple, after all." are obtained by a voice recognition unit 2 (step ST102). Then, by referring to a location name storage unit 3 as shown in FIG. 2 and the route setting expression storage unit 4 as shown in FIG. 24, from the recognition result of A, the keyword extraction unit 5 extracts "Kiyomizu-dera Temple" as a location name and "via" as a route setting expression corresponding to "Kiyomizu-dera Temple", and also extracts "Kyoto Station" as the location name and "want to go" as the route setting expression corresponding to "Kyoto Station". Also, from the recognition result of B, the extraction unit extracts "via" as the route setting expression corresponding to the location names "Kiyomizu-dera Temple" and "Sanjusangen-do Temple", and also extracts "want to go" as the route setting expression corresponding to the location name "Kyoto Station". Moreover, from the recognition result of C, "Sanjusangen-do Temple" is extracted as the location name and "let's cancel" is extracted as the route setting expression corresponding to "Sanjusangen-do Temple" (Step ST103).

Then, since the route setting expressions "via", "want to go", and "let's cancel" are extracted (case of YES in step ST104), a route setting action acquisition unit 7 searches a route setting action storage unit 6 as shown in FIG. 4 using the route setting expressions "via", "want to go", and "let's cancel" as search keys and searches for route setting expressions matching the search keys to thus acquire the route setting action "set as via point" corresponding to "via", the route setting action "set as destination" corresponding to "want to go", and the route setting action "delete route" corresponding to "let's cancel" (step ST105).

As a result, if no recognition result of C exists, there exists two kinds of routes including "the route having Kyoto Station as the destination via Kiyomizu-dera Temple" acquired from the recognition result of A, and "the route having Kyoto Station as the destination via Kiyomizu-dera Temple and Sanjusangen-do Temple" acquired from the recognition result of B as shown in FIG. 23. However, in Embodiment 11, since the route setting action of "delete route" with respect to "Sanjusangen-do Temple" is further acquired from the recognition result of C, "the route having Kyoto Station as the destination via Kiyomizu-dera Temple and Sanjusangen-do Temple" acquired from the recognition result of B is deleted. Accordingly, since only "the route having Kyoto Station as the destination via Kiyomizu-dera Temple" finally remains, this route is searched and set (step ST106).

In addition, for example, when the utterance of C is made a little while after the conversation between A and B, as shown in Embodiment 10, two kinds of routes have been presented to the user by, for example, displaying a table as shown in FIG. 23 on a display screen, displaying the routes on a displayed map, and so on, based on the recognition result of A and the recognition result of B. Then, when in this situation the utterance of C "Let's cancel Sanjusangen-do Temple, after all." is made, the voice acquisition unit 1 acquires voice data thereof (step ST101), and the recognition result of "Let's cancel Sanjusangen-do Temple, after all." is obtained by the voice recognition unit 2 (step ST102). Then, by referring to the location name storage unit 3 as shown in FIG. 2 and the route setting expression storage unit 4 as shown in FIG. 24, the keyword extraction unit 5 extracts "Sanjusangen-do Temple" as the location name and "let's cancel" as the route setting expression corresponding to "Sanjusangen-do Temple" (Step ST103).

Then, since the route setting expression "let's cancel" is extracted (case of YES in step ST104), the route setting action acquisition unit 7 searches the route setting action storage unit 6 as shown in FIG. 4 using the route setting expression "let's cancel" as the search key to search the route setting expression matching the search key to thus acquire the route setting action "delete route" corresponding to "let's cancel" (step ST105). As a result, a position of the location name "Sanjusangen-do Temple" is identified, and the route including the location is deleted. In other words, the route of number 2 "set Kyoto Station as the destination via Kiyomizu-dera Temple and Sanjusangen-do Temple" shown in FIG. 23 is deleted and no longer presented. Thus, the route is searched and set with respect to the remaining route of number 1 "set Kyoto Station as the destination via Kiyomizu-dera Temple" (step ST106).

As described above, according to Embodiment 11, since it becomes unnecessary to set the plurality of routes by hand, and further the user can confirm route candidates after cancellation, thereby improving a convenience thereof.

Embodiment 12

Figure 27:
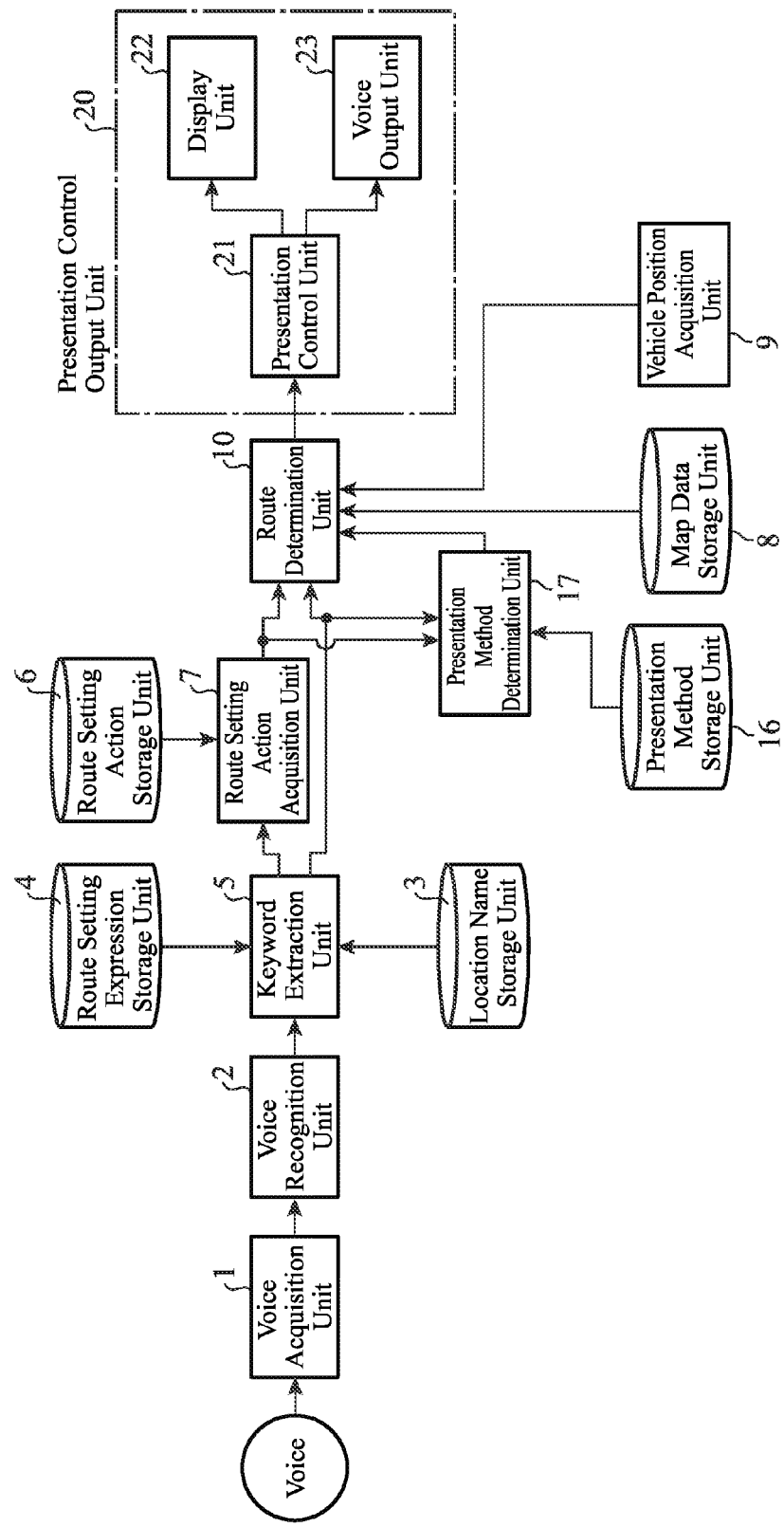
FIG. 27 is a block diagram showing an example of a navigation device according to Embodiment 12.

FIG. 27 is a block diagram showing an example of a navigation device according to Embodiment 12 of the present invention. Note that components similar to those described in Embodiments 1 to 11 are denoted by same reference numerals, and duplicated descriptions thereof will be omitted. In Embodiment 12 described below, similarly to Embodiment 10, a case where a plurality of routes are searched is assumed; compared with Embodiment 10 (in the block diagram, the same as that of FIG. 1 in Embodiment 1), a presentation method storage unit 16 and a presentation method determination unit 17 are further provided. Then, it is contemplated that a method of presenting the plurality of routes is changed by an importance of the route.

The presentation method storage unit 16 stores an importance of a route to be presented and a presentation method corresponding to the importance. FIG. 28 is a diagram showing an example of the presentation method storage unit 16. As shown in FIG. 28, the presentation method storage unit 16 stores the presentation methods corresponding to the importance of the routes, such as a presentation method 1 in which the routes are presented in different colors, according to the importance of the routes, and a presentation method 2 in which thicknesses of the routes are changed and presented. In the example shown in FIG. 28, when the importance is 1, "red" is set in the presentation method 1, while "extra-thick" is set in the presentation method 2. Also, when the importance is 2, "yellow" is set in the presentation method 1, while "thick" is set in the presentation method 2, and when the importance is 3, "blue" is set in the presentation method 1, while "thin" is set in the presentation method 2. Furthermore, in addition to the presentation methods shown in FIG. 28, it may be appropriately determined which presentation method is to be adopted, including a presentation method in which the importance or searched order is assigned to the route, a method which gives a presentation with combining the plurality of presentation methods, and so on. Note that in Embodiment 12, it is assumed to be set in advance that the presentation method 1 is adopted in the presentation method storage unit 16 as shown in FIG. 28 unless special circumstances or conditions exist.

The presentation method determination unit 17 decides whether or not there are the plurality of routes to be searched, and when it is decided that there are the plurality of routes, the presentation method determination unit 17 refers to the presentation method storage unit 16 as shown in FIG. 28 to determine the presentation method corresponding to the importance of each of the plurality of routes, and outputs the resultant to the route determination unit 10. Moreover, though in Embodiment 12 when there are the plurality of routes to be searched, the presentation method is assumed to be determined corresponding to the importance of each of the plurality of routes, it may be configured such that the user can select which presentation method to be adopted through a key input unit 12 (not shown in the block diagram of FIG. 27).

Then, the route determination unit 10 in Embodiment 12 searches for the plurality of routes, and presents the respective routes to the user using the presentation method determined by the presentation method determination unit 17.

Figure 29:
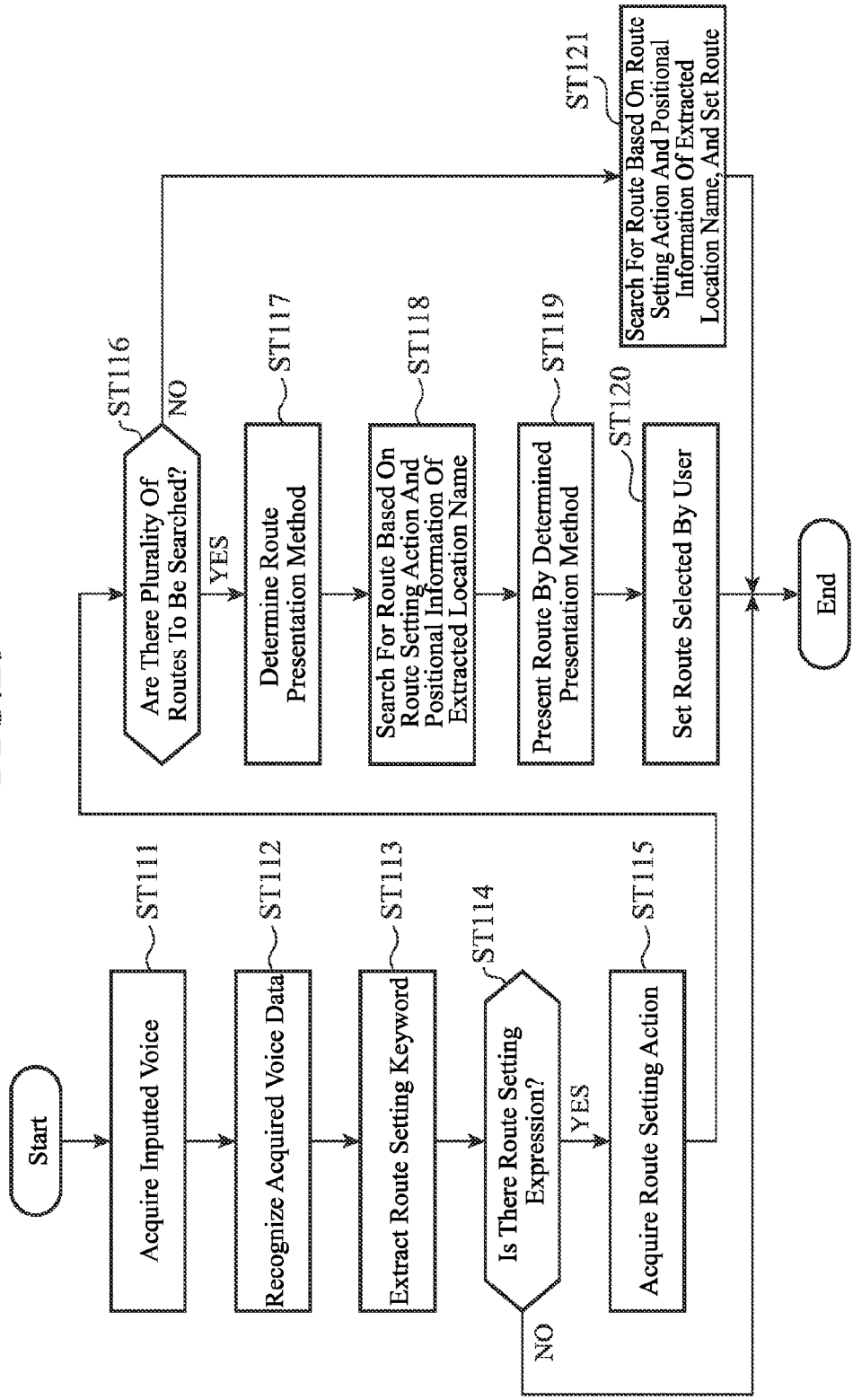
FIG. 29 is a flowchart showing an operation of the navigation device according to Embodiment 12.

FIG. 29 is a flowchart showing an operation of the navigation device according to Embodiment 12.

Since processing of steps ST111 to ST115 are the same as that of steps ST91 to ST95 in the flow chart of FIG. 22 in Embodiment 10, a description thereof will be omitted. Then, in Embodiment 12, the presentation method determination unit 17 decides whether or not there are the plurality of routes to be searched (step ST116), and when there are the plurality of routes (case of YES in step ST116), the presentation method determination unit 17 refers to the presentation method storage unit 16 to determine the presentation method and outputs the resultant to the route determination unit 10 (step ST117). Then, with respect to a location name extracted by a keyword extraction unit 5, the route determination unit 10 refers to map data to acquires a position thereof, and searches for all routes, based on the acquired positional information, a route setting action acquired in step ST115, and a present position of a vehicle (mobile object) acquired by a vehicle position acquisition unit (position acquisition unit) 9 (step ST118). Then, an instruction is issued to a presentation control unit 21 to present the plurality of searched routes to the user using the presentation method determined in step ST117 corresponding to the importance of the routes, and the searched routes are presented through a display unit 22 or a voice output unit 23 (step ST119). Then, the route selected by the user is set (step ST120).

On the other hand, in the decision of step ST116, when there is only one route instead of the plurality of routes to be searched (case of NO in step ST116), in a similar manner to step ST06 of the flow chart of FIG. 5 in Embodiment 1, with respect to the location name extracted by the keyword extraction unit 5, the position thereof is acquired by referring to the map data, the route is searched based on the acquired positional information, the route setting action acquired in step ST115, and the present position of the vehicle (mobile object) acquired by the vehicle position acquisition unit (position acquisition unit) 9, and the searched route is set (step ST121).

In an illustration by a specific example, let us assume that the following conversation is made by users: A "I want to go to Kyoto Station via Kiyomizu-dera Temple." and B "Let's see, I'd like to go to Kyoto Station via Kiyomizu-dera Temple and Sanjusangen-do Temple." As a result, the voice acquisition unit 1 acquires voice data thereof (step ST111), and recognition results of A "I want to go to Kyoto Station via Kiyomizu-dera Temple." and B "Let's see, I'd like to go to Kyoto Station via Kiyomizu-dera Temple and Sanjusangen-do Temple." are obtained by a voice recognition unit 2 (step ST112). Then, by referring a location name storage unit 3 as shown in FIG. 2 and a route setting expression storage unit 4 as shown in FIGS. 3, 17, 24, and the like, from the recognition result of A, the keyword extraction unit 5 extracts "Kiyomizu-dera Temple" as a location name and "via" as a route setting expression corresponding to "Kiyomizu-dera Temple", and also extracts "Kyoto Station" as the location name and "want to go" as the route setting expression corresponding to "Kyoto Station". Further, from the recognition result of B, the extraction unit extracts "via" as a route setting expression corresponding to the location names "Kiyomizu-dera Temple" and "Sanjusangen-do Temple", and also extracts "want to go" as the route setting expression corresponding to the location name "Kyoto Station" (Step ST113).

Then, since the route setting expressions "via" and "want to go" are extracted (case of YES in step ST114), a route setting action acquisition unit 7 searches a route setting action storage unit 6 as shown in FIG. 4 using the route setting expressions "via" and "want to go" as search keys, and searches for route setting expressions matching the search keys to thus acquire the route setting action "set as via point" corresponding to "via" and the route setting action "set as destination" corresponding to "want to go" (step ST115).

In this case, as shown in FIG. 23, there exist two kinds of routes including information (number 1) acquired from the recognition result of A, and information (number 2) acquired from the recognition result of B. Therefore, the presentation method determination unit 17 decides that there are two (plural) routes to be searched (case of YES in step ST116). Then, the presentation method determination unit 17 refers to the presentation method storage unit 16, and determines the presentation method 1 (red when the importance is 1, yellow when the importance is 2, and blue when the importance is 3) set in Embodiment 12 as the presentation method, and outputs the resultant to the route determination unit 10 (step ST117).

With respect to the recognition result of A, the route determination unit 10 refers to the map data storage unit 8 to acquire positions of location names "Kiyomizu-dera Temple" and "Kyoto Station" and searches for the route having "Kiyomizu-dera Temple" as the via point and "Kyoto Station" as the destination, based on the positional information of the "Kiyomizu-dera Temple" and the route setting action of "set as via point", the positional information of "Kyoto Station" and the route setting action of "set as destination", and the position of the vehicle (mobile object), and with respect to the recognition result of B, the determination unit also acquires the positions of location names "Kiyomizu-dera Temple", "Sanjusangen-do Temple", and "Kyoto Station", and searches for the route having "Kiyomizu-dera Temple" and "Sanjusangen-do Temple" as the via points and "Kyoto Station" as the destination, based on the positional information of "Kiyomizu-dera Temple" and the route setting action of "set as via point", the positional information of "Sanjusangen-do Temple" and the route setting action of "set as via point", the positional information of "Kyoto Station" and the route setting action of "set as destination", and the position of the vehicle (mobile object) (step ST118).

Then, a route is presented to the user by the presentation method determined in step ST117 (step ST119).

An importance decision method will now be described. As an example of the decision method, for example, the following is conceivable: a method that gives greater importance to the route appeared in a later part of a conversation. FIG. 30 is a table shown such that the importance and the presentation method are added to the route (number 1) acquired from the recognition result of A, and the route (number 2) acquired from the recognition result of B. With respect to the importance, later uttered information B is given the importance of 1, and earlier uttered information A is given the importance of 2. In addition, there is shown: by the presentation method determined in step ST117, the route (number 2) of the importance 1 is to be presented in red, and the route (number 1) of the importance 2 is to be presented in yellow.

Figure 31:
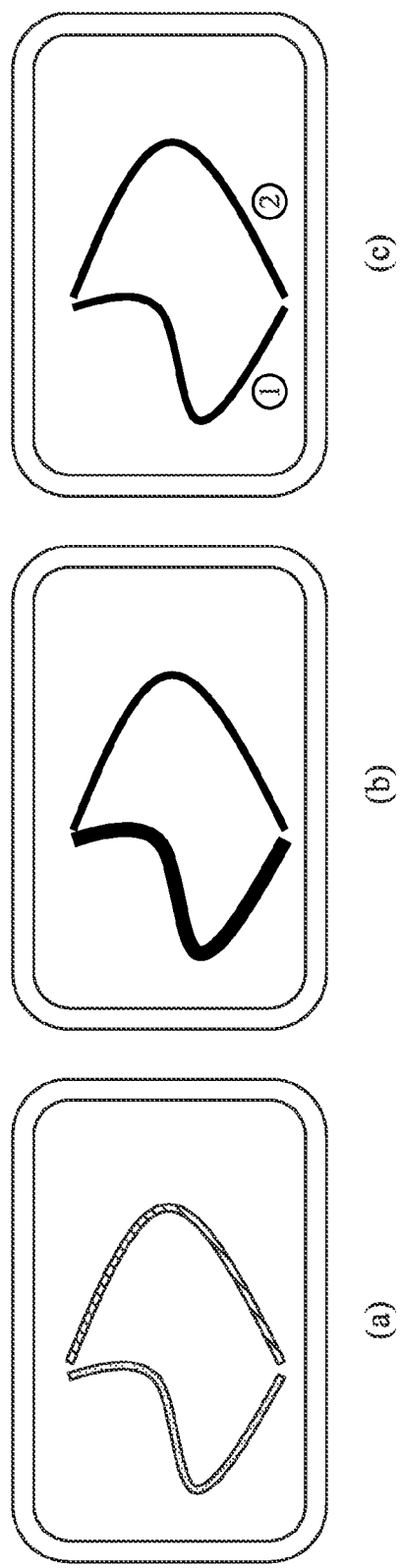
FIG. 31 is a diagram showing an example of a route presentation screen in Embodiment 12.

FIG. 31 is a diagram showing an example of a presentation screen of the routes. FIG. 31(*a*) is the one in which the colors of the routes are changed corresponding to the importance of the routes, and the presentation method determined in the above specific example. Also, FIG. 31(*b*) is the one in which the thicknesses of roads are changed corresponding to the importance of the routes, and FIG. 31(*c*) is the one displayed such that the importance is attached to the routes.

Then, on this occasion, on a screen presented to the user as shown in FIG. 31(*a*), when the route to be desirably selected by the user is selected by touching the route, and so on, the route determination unit 10 sets the selected route (step ST120).

Additionally, it may be configured such that whether or not the function for presentation method determination in Embodiment 12 is used can be set by the user.

As described above, according to Embodiment 12, it becomes unnecessary to set the plurality of routes by hand, and further the routes having high possibilities to be set becomes to be confirmed more easily by the user among the plurality of route candidates, and the route can be selected after that confirmation, thereby improving a convenience thereof.

Embodiment 13

A block diagram showing an example of a navigation device according to Embodiment 13 of the present invention has the same configuration with the block diagram shown in FIG. 14 in Embodiment 6, an illustration and a description thereof will be omitted. In Embodiment 13 described below, it is configured such that when only a route setting expression is extracted and a location name is not extracted, a facility corresponding to the route setting expression is searched based on a time, and the facility is presented, or a route having the facility as a via point is searched and set.

In Embodiment 13, a route setting expression storage unit 4 is assumed to include an expression of a point in time as shown in FIG. 17 or 24, for example, and particularly include time expressions of "xxx time". In addition, as shown in FIG. 32, for example, it is assumed that a route setting action in a case where a location name corresponding to a route setting expression is not extracted is also set in a route setting action storage unit 6. Additionally, in this case, with respect to a route setting expression of "take a rest", the route setting action of "display rest area or restaurant" is associated when the location name is not extracted.

Figure 33:
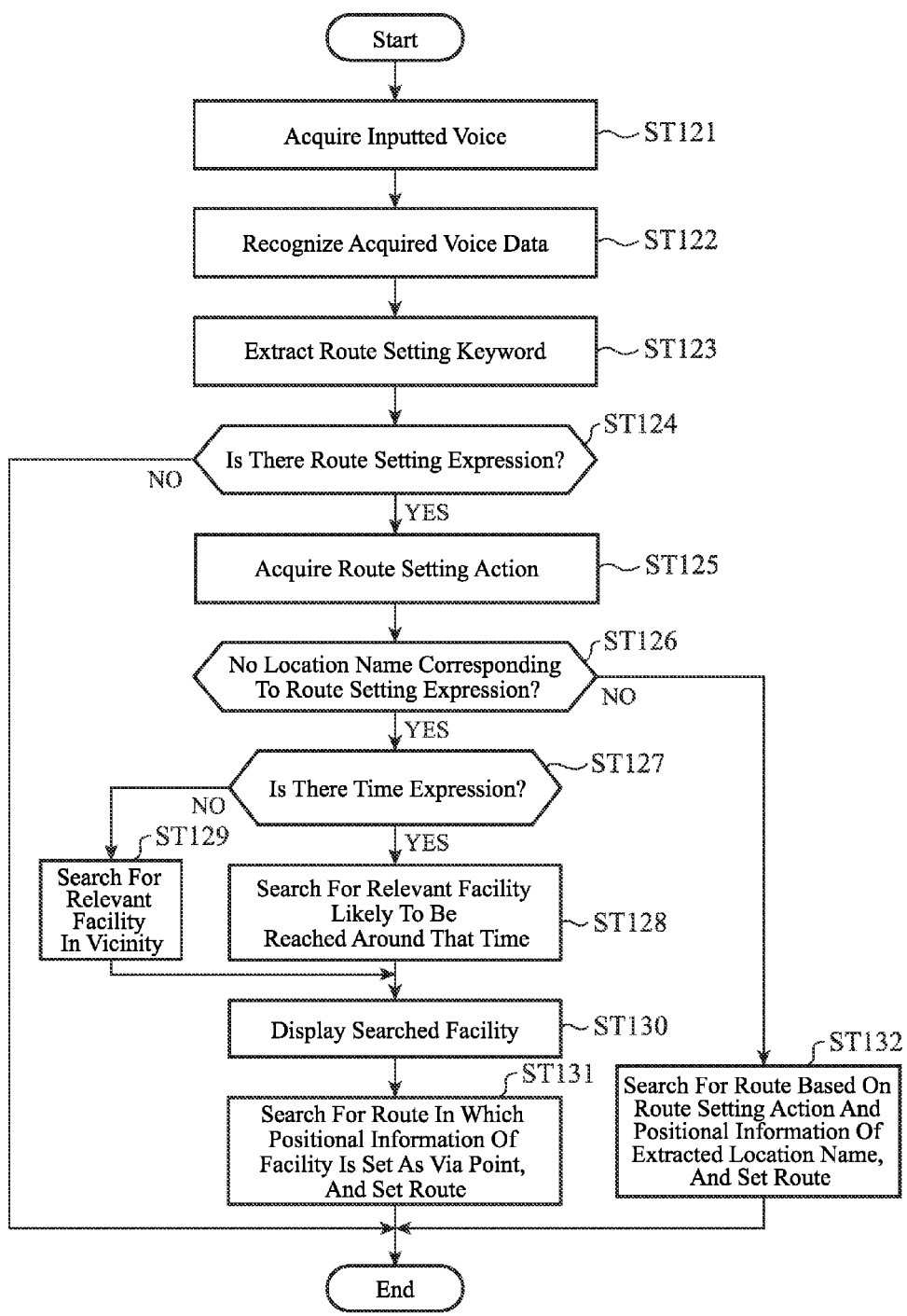
FIG. 33 is a flow chart showing an operation of a navigation device according to Embodiment 13.

FIG. 33 is a flow chart showing an operation of the navigation device according to Embodiment 13.

Since processing of steps ST121 to ST125 are the same as that of steps ST01 to ST05 in the flow chart of FIG. 5 in Embodiment 1, a description thereof will be omitted. Then, in Embodiment 13, when the route setting expression is extracted, but the corresponding location name is not extracted in step ST123 (case of YES in step ST126), a decision is further made whether or not a time expression is extracted (step ST128).

For example, if a user utters "I want to take a rest at around 12 o'clock", since a time expression of "12 o'clock" is extracted (case of YES in step ST127), based on map data, a position of a vehicle (mobile object), and a current time, a route determination unit 10 searches for a relevant facility (rest area or restaurant for performing "display rest area or restaurant" that is set as the route setting action in FIG. 32) around the route which is likely to be reached at the "12 o'clock" (step ST128). On the other hand, if the user utters "I want to take a short rest", since the time expression is no extracted (case of NO in step ST127), it is decided that the user wishes to take a rest immediately and the relevant facility (rest area or restaurant) around the present position is searched (step ST129). Then, the searched facility is displayed (step ST130). In this case, it is assumed that the facility that is predicted to be reached at the time closest to the time expression extracted in step ST123 (in this example, "12 o'clock") is searched and displayed. Thereafter, the route in which the positional information of the searched and displayed facility is set as the via point is searched and set (step ST131).

On the other hand, in the decision of step ST126, when the location name corresponding to the route setting expression is extracted, in a similar manner to step ST06 in the flow chart of FIG. 5 in Embodiment 1, with respect to the location name extracted by a keyword extraction unit 5, the route determination unit 10 acquires a position thereof by referring to a map data storage unit 8, searches for the route, based on the acquired positional information, the route setting action acquired in step ST125, and a present position of the vehicle (mobile object) acquired by a vehicle position acquisition unit (position acquisition unit) 9, and sets the searched route (step ST132).

In addition, in the steps ST128 to ST131 of the flow chart in FIG. 33, it is described such that the relevant facility to be reached at the time closest to the extracted time expression (in this example, "12 o'clock") is searched and displayed, and the route in which the facility is set as the via point is automatically searched and set; however, it may be configured such that the user can select whether or not to set the displayed facility as the via point by voice or the key input unit 12 (not shown in the block diagram of FIG. 14). Further, it may be configured such that when there are the plurality of searched facilities, the plurality of facilities are displayed, and the user can select one of the facilities and then set it as the via point.

Figure 34:
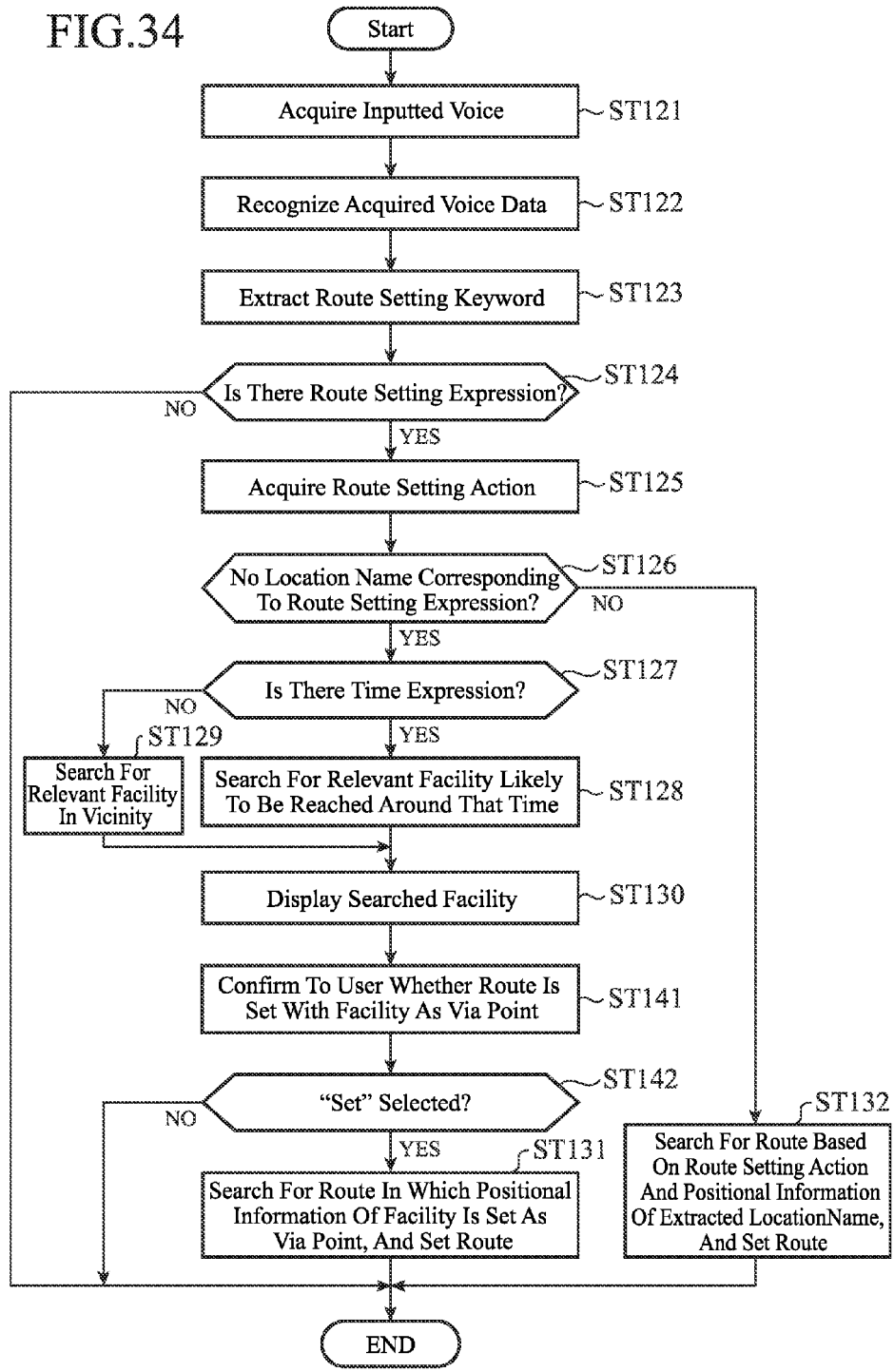
FIG. 34 is a flow chart showing another operation of the navigation device according to Embodiment 13.

FIG. 34 is a flow chart showing an operation of a case in which the user can select whether or not to set the searched facility as the via point as mentioned above.

In FIG. 34, since steps ST121 to ST130 and ST132 are the same as those in FIG. 33, a description thereof will be omitted. Then, in step ST128 or ST129, when the searched facility is displayed (step ST130), whether or not the route having the facility as the via point is set is further confirmed to the user (step ST141).

FIG. 35(a) is an example of a screen displaying a dialog for confirming to the user whether or not the route is set having the facility as the via point when the searched facility is displayed. In FIG. 35(a), on a display screen in which a triangular vehicle icon 32 representing the present position of the vehicle (mobile object) and a set route 33 that is presently on travel are displayed on a navigation screen 31, Restaurant ●● is displayed as the facility that is predicted to be reached around the extracted time expression "12 o'clock" and further a dialog 34 of "Include as via point and set route?" for confirming to the user whether or not the route having the facility (Restaurant ●●) as the via point is set is displayed. At this time, as shown in FIG. 35(a), it may be configured such that buttons of "YES" and "NO" which can be selected by the user is displayed in the dialog 34, or a voice output of "Include as via point and set route?" is performed at the same moment when the searched facility (Restaurant ●●) is displayed, and the user can make a selection by uttering "YES" or "NO".

Then, when "YES" (set) is selected by the user (case of YES in step ST142), the positional information of the facility is acquired from map data, and the route in which the positional information is set as the via point is searched and set (step ST131).

FIG. 35(b) shows a state where when "YES" is selected by the user in the dialog 34 shown in FIG. 35(a), as a result that the route having the searched facility (Restaurant ●●) is set as the via point, a new set route 33' is displayed.

On the other hand, in step ST142, when "NO" is selected (case where "set" is not selected) by the user (case of NO in step ST142), the processing is ended as it is.

In addition, it may be configured such that the plurality of relevant facilities are searched in step ST128 or ST129. For example, it may be configured such that all the relevant facilities (rest areas and restaurants) that are predicted to be reached around "12 o'clock", within 10 minutes around 12 o'clock, namely between 11:50 and 12:10, are displayed, and that the user can select and set the user-desired facility from among the displayed.

Figure 36:
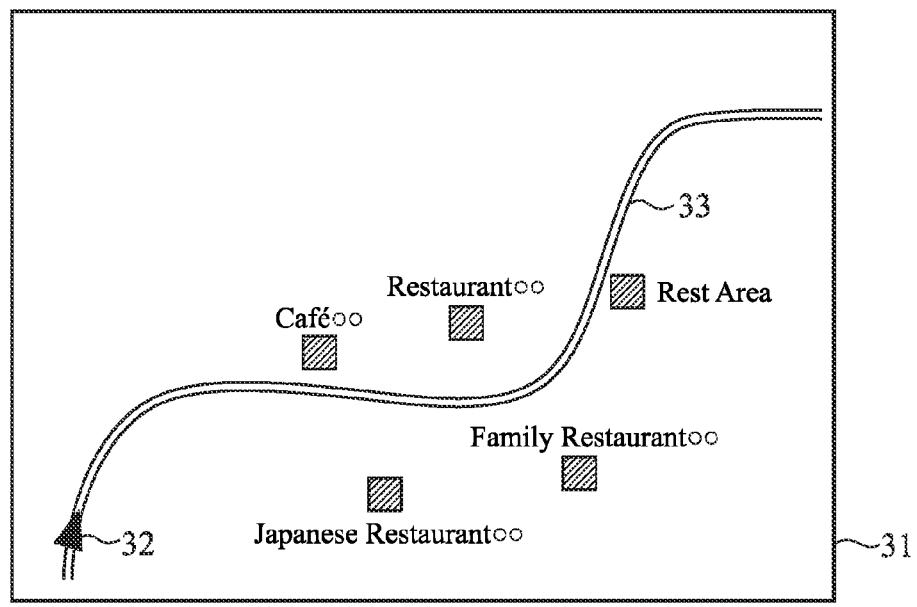
FIG. 36 is a diagram showing an example of a screen when the plurality of searched facilities are displayed in Embodiment 13.

FIG. 36 shows an example of a screen displaying the plurality of searched facilities. In FIG. 36, on a display screen in which the triangular vehicle icon 32 representing the present position of the vehicle (mobile object) and the set route 33 that is presently on travel are displayed on a navigation screen 31, five facilities including "Café ●●", "Japanese Restaurant ●●", "Restaurant ●●", "Family Restaurant ●●", and "Rest Area ●●" are displayed as the facilities that are predicted to be reached around the extracted time expression "12 o'clock".

It may be configured such that in this situation, the user can select the facility by touching the facility to be desirably set as the via point, or each of the facilities is displayed with a number attached, and the facility can be selected by inputting or uttering the number. In addition, it may be configured such that by selecting the facility, the route having the facility as the via point is automatically searched and set, or it may be configured such that in a similar manner to the dialog 34 shown in FIG. 35(a), in a state where the dialog of "Include as via point and set route?" is displayed or outputted by voice, then when the user selects or utters "YES", it is set as the route.

Then, for example, when "Restaurant ●●" is selected by the user, the positional information of the facility is acquired from the map data, and the route in which the positional information is set as the via point is searched and set. Accordingly, in a similar manner to the diagram shown in FIG. 35(b), the route having the selected facility (Restaurant ●●) as the via point is set and the set route 33' is newly displayed.

Additionally, it may be configured such that when the location name is not extracted in Embodiment 13, the user can set whether or not the function for searching the facility and setting the via point is used.

As described above, according to Embodiment 13, when a time at which the user wishes to take a rest is uttered even if a specific location or name is unknown, a location where the user can take a rest is presented, and a route having the location as the via point can be set, and further the user can select the route after confirmation, thereby improving a convenience thereof.

Moreover, though in this embodiment, it is described as a navigation device for a vehicle, the navigation device according to the present invention, not limited to the one device for the vehicle, is the navigation device for mobile objects including a person, a vehicle, a train, an ocean vessel, and an airplane, and particularly relates to the navigation device that is suitably carried on or mounted to the vehicle; as long as a device is provided such that it is possible to provide navigation by a voice interaction between the user and the device such as a mobile navigation device, it can be applied to the one in any form.

It is noted that the present invention can be implemented by a free combination of the embodiments, a modification of arbitrary components of the embodiments, or an omission of arbitrary components of the embodiments, within the scope of the invention.

INDUSTRIAL APPLICABILITY

The navigation device according to the present invention can be applied to a vehicle-mounted navigation device or a mobile navigation device capable of providing navigation by a voice interaction between the user and the device.

1 voice acquisition unit,
2 voice recognition unit,
3 location name storage unit,
4 route setting expression storage unit,
5 keyword extraction unit,
6 route setting action storage unit,
7 route setting action acquisition unit,
8 map data storage unit,
9 vehicle position acquisition unit (position acquisition unit),
10 route determination unit,
11 location identification unit,
12 key input unit,
13 name recognition level storage unit,
14 time acquisition unit,
15 route search necessity selection unit,
16 presentation method storage unit,
17 presentation method determination unit,
20 presentation control output unit,
21 presentation control unit,
22 display unit,
23 voice output unit,
31 navigation screen,
32 vehicle icon,
33 set route,
34 user confirmation dialog.

The invention claimed is:

1. A navigation device which includes a position acquisition unit that acquires a position of a mobile object, and which provides route guidance based on the position of the mobile object acquired by the position acquisition unit, and map data, the navigation device comprising:
a voice acquisition unit that detects and acquires an inputted voice;
a voice recognition unit that constantly recognizes voice data acquired by the voice acquisition unit when the navigation device is activated;
a location name storage that stores a place name and a facility name as a location name;
a route setting expression storage that stores a route setting expression used when a user performs a route setting;
a keyword extraction unit that extracts a location name and a route setting expression from a recognition result of the voice recognition unit by referring to the location name storage and the route setting expression storage;
a route setting action storage that stores a route setting action corresponding to the route setting expression in association with the route setting expression;
a route setting action acquisition unit that and acquires the corresponding route setting action based on the route setting expression extracted by the keyword extraction unit by referring to the route setting action storage;
a route determination unit that searches for a route to a location identified from the location name extracted by the keyword extraction unit based on the route setting action acquired by the route setting action acquisition unit, and sets the searched route; and
a location identification unit that, when there exist the plurality of locations identified from the specific location name extracted by the keyword extraction unit, identifies the location at one place from the plurality of locations, wherein
the route determination unit searches for the route to the location identified by the location identification unit based on the route setting action acquired by the route setting action acquisition unit, and sets the searched route.

2. The navigation device according to claim 1, wherein
the location identification unit identifies the location at one place from among the plurality of locations based on the position of the mobile object acquired by the position acquisition unit, and positions of the plurality of locations.

3. The navigation device according to claim 1, further comprising:
a name recognition level storage that stores a name recognition level of the location, wherein
the location identification unit identifies the location at one place from among the plurality of locations based on the name recognition level stored in the name recognition level storage.

4. The navigation device according to claim 1, wherein
the route determination unit decides whether or not the route has already been set, and when a decision is made the route has already been set, the route determination unit searches for a route, to which the location identified from the location name extracted by the keyword extraction unit is added thereto as a via point, and sets the searched route, regardless of the route setting action acquired by the route setting action acquisition unit.

5. The navigation device according to claim 4, wherein
when adding the location identified from the location name extracted by the keyword extraction unit as the via point, the route determination unit decides whether or not the identified location is within a prescribed range from the position of the mobile object acquired by the position acquisition unit or a destination of the route that has already been set, and when a decision is made the identified location is within a prescribed range, the route determination unit searches for the route to which the identified location is added as the via point, and sets the searched route, and when a decision is made the identified location is not within a prescribed range from both the position of the mobile object and the destination of the route, the route determination unit does not set the route to which the identified location is added as the via point.

6. The navigation device according to claim 1, wherein the route setting expression storage includes a route setting expression representing a point in time,
the keyword extraction unit refers to the route setting expression storage, and also extracts the route setting expression representing the point in time from the recognition result by the voice recognition unit, and
the route determination unit does not set the route when the route setting expression representing the point in time extracted by the keyword extraction unit is the one representing the future point in time that is equal to or beyond a prescribed time.

7. The navigation device according to claim 1, wherein when the plurality of routes are searched as the result of the search for the route by the route determination unit, the route determination unit presents the plurality of routes, and selects and sets the specific route among from the plurality of routes.

8. The navigation device according to claim 7, wherein the route setting expression storage includes a canceling/correcting expression that is used when making a cancellation or a correction,
the keyword extraction unit refers to the route setting expression storage, and also extracts the canceling/correcting expression from the recognition result by the voice recognition unit, and
the route determination unit changes the route setting based on the canceling/correcting expression extracted by the keyword extraction unit.

9. The navigation device according to claim 7, further comprising:
a presentation method storage that stores an importance of the route to be presented, and a presentation method corresponding to the importance; and
a presentation method determination unit that refers to the presentation method storage, and determines the presentation method corresponding to the importance of each of the plurality of routes, wherein
the route determination unit presents the plurality of routes based on the presentation method determined by the presentation method determination unit.

10. The navigation device according to claim 1, further comprising:
a route search necessity selection unit that allows a user to select a necessity of a route search by the route determination unit, wherein
the route determination unit searches for the route when search "necessary" is selected by the route search necessity selection unit, and the route determination unit does not search for the route when search "not necessary" is selected.

11. The navigation device according to claim 1, wherein the route setting action storage stores the route setting action in a case where only the route setting expression is extracted while the location name is not extracted by the keyword extraction unit, in association with the route setting expression together with a facility corresponding to the route setting expression, in addition to the route setting action in a case where the location name and the route setting expression are extracted by the keyword extraction unit, and
when only the route setting expression is extracted while the location name is not extracted by the keyword extraction unit, the route determination unit searches for the facility corresponding to the extracted route setting expression, and presents the searched facility.

12. The navigation device according to claim 1, wherein the route determination unit calculates a length of the searched route, and does not set the route when the calculated length of the route exceeds a prescribed threshold.

13. The navigation device according to claim 1, wherein the route determination unit calculates a required time to a destination of the searched route, and does not set the route when the calculated required time exceeds a prescribed threshold.

14. The navigation device according to claim 1, further comprising:
a time acquisition unit that acquires a current time, wherein the route determination unit calculates an estimated time of arrival at a destination of the searched route based on the current time acquired by the time acquisition unit, and does not set the route when the calculated estimated time of arrival is later than a prescribed time.

15. A navigation method that includes a step of acquiring a position of a mobile object by a position acquisition unit, and a step of providing route guidance based on the position of the mobile object acquired by the position acquisition unit, and map data,
the navigation method comprising:
a step of detecting and acquiring an inputted voice by a voice acquisition unit;
a step of recognizing constantly voice data acquired by the voice acquisition unit by the voice recognition unit when the navigation device is activated;
a step of storing a place name and a facility name as a location name by a location name storage;
a step of storing a route setting expression used when a user performs a route setting by a route setting expression storage;
a step of extracting a location name and a route setting expression from a recognition result of the voice recognition unit by referring to the location name storage and the route setting expression storage by a keyword extraction unit;
a step of storing a route setting action corresponding to the route setting expression in association with the route setting expression by a route setting action storage;
a step of acquiring a corresponding route setting action by a route setting action acquisition unit, based on the route setting expression extracted by the keyword extraction unit, by referring to the route setting action storage;
a step of searching for a route to a location identified from the location name extracted by the keyword extraction unit based on the route setting action acquired by the route setting action acquisition unit, and sets the searched route; and a step of location identification that, when there exist the plurality of locations identified from the specific location name extracted by the keyword extraction unit, identifies the location at one place from the plurality of locations, wherein the step of searching for a route searches for the route to the location identified by the step of location identification based on the route setting action acquired by the route setting action acquisition unit, and sets the searched route.

* * * * *

UNITED STATES PATENT AND TRADEMARK OFFICE
CERTIFICATE OF CORRECTION

PATENT NO.        : 8,965,697 B2
APPLICATION NO.   : 14/131658
DATED             : February 24, 2015
INVENTOR(S)       : Yuki Sumiyoshi et al.

It is certified that error appears in the above-identified patent and that said Letters Patent is hereby corrected as shown below:

IN THE CLAIMS:

Claim 1, at column 32, line 23, change "that and acquires the" to --that acquires the--.

Signed and Sealed this
Fourth Day of August, 2015

Michelle K. Lee
*Director of the United States Patent and Trademark Office*